(12) United States Patent
Poli

(10) Patent No.: US 12,407,435 B2
(45) Date of Patent: *Sep. 2, 2025

(54) SYSTEM FOR CHANNEL MAP DELIVERY FOR HI SPLIT CABLE NETWORKS

(71) Applicant: ARRIS Enterprises LLC, Horsham, PA (US)

(72) Inventor: Christopher Poli, Doylestown, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,381

(22) Filed: Mar. 6, 2024

(65) Prior Publication Data
US 2024/0356664 A1 Oct. 24, 2024

Related U.S. Application Data

(63) Continuation of application No. 17/732,377, filed on Apr. 28, 2022, now Pat. No. 11,962,400.

(60) Provisional application No. 63/183,382, filed on May 3, 2021.

(51) Int. Cl.
*H04H 20/78* (2008.01)
*H04L 5/00* (2006.01)

(52) U.S. Cl.
CPC ........... *H04H 20/78* (2013.01); *H04L 5/0092* (2013.01)

(58) Field of Classification Search
CPC .............................. H04H 20/78; H04L 5/0092
See application file for complete search history.

(56) References Cited

U.S. PATENT DOCUMENTS

| | | | | |
|---|---|---|---|---|
| 5,841,771 A | * | 11/1998 | Irwin | H04Q 11/0478 370/383 |
| 6,357,028 B1 | * | 3/2002 | Zhu | H04N 21/6377 714/751 |
| 6,396,850 B1 | * | 5/2002 | de Vito | H04N 7/1675 348/E7.056 |
| 6,665,345 B1 | * | 12/2003 | Sekiguchi | H04N 19/66 375/E7.279 |
| 6,980,731 B1 | * | 12/2005 | Tahara | H04N 21/43632 386/E9.036 |
| 6,983,323 B2 | * | 1/2006 | Cantrell | H04L 69/22 709/225 |
| 7,139,923 B1 | * | 11/2006 | Chapman | H04N 21/242 713/400 |
| 7,617,509 B1 | * | 11/2009 | Brunheroto | H04N 17/004 725/19 |
| 7,760,826 B2 | * | 7/2010 | Chang | H04L 25/03019 375/346 |
| 8,279,884 B1 | * | 10/2012 | Narasimha | H04L 47/365 370/410 |
| 8,284,259 B2 | * | 10/2012 | Karacali-Akyamac | H04L 43/024 348/180 |

(Continued)

OTHER PUBLICATIONS

International Search Report and Written Opinion RE: Application No. PCT/US2022/26836, dated Sep. 23, 2022.

*Primary Examiner* — Michael B. Pierorazio
(74) *Attorney, Agent, or Firm* — Chernoff, Vilhauer, McClung & Stenzel, LLP

(57) ABSTRACT

A system for more granular channel map delivery in support of operationally enabling more granular plant bandwidth manipulation.

25 Claims, 30 Drawing Sheets

(56) References Cited

U.S. PATENT DOCUMENTS

| | | | | |
|---|---|---|---|---|
| 8,620,275 B2* | 12/2013 | Minear | H04N 21/812 | 725/62 |
| 9,203,498 B2* | 12/2015 | Ohayon | H04L 69/324 | |
| 9,559,983 B1* | 1/2017 | Ramesh | H04L 43/0811 | |
| 10,735,120 B1* | 8/2020 | Kantharaju | H04L 43/087 | |
| 2002/0053053 A1* | 5/2002 | Nagai | H04L 1/205 | 375/E7.016 |
| 2002/0196363 A1* | 12/2002 | Furusawa | H04N 21/4344 | 348/461 |
| 2003/0051254 A1* | 3/2003 | Weidenfeller | H04N 21/6582 | 725/98 |
| 2004/0105463 A1* | 6/2004 | Cheung | H04L 1/0001 | 370/468 |
| 2004/0153940 A1* | 8/2004 | Yu | H03M 13/2957 | 714/746 |
| 2005/0100100 A1* | 5/2005 | Unger | H04N 21/6373 | 375/E7.134 |
| 2005/0120124 A1* | 6/2005 | Korhonen | H04L 1/0009 | 714/746 |
| 2005/0180415 A1* | 8/2005 | Cheung | H04N 21/6437 | 348/E7.071 |
| 2005/0262529 A1* | 11/2005 | Neogi | H04N 21/63345 | 725/31 |
| 2007/0053303 A1* | 3/2007 | Kryuchkov | H04L 43/0852 | 370/252 |
| 2008/0075031 A1* | 3/2008 | Ohayon | H04N 21/6143 | 370/316 |
| 2008/0192119 A1* | 8/2008 | Li | H04N 21/44209 | 348/180 |
| 2008/0259962 A1* | 10/2008 | Mori | H04N 21/4305 | 375/E7.278 |
| 2009/0158326 A1* | 6/2009 | Hunt | H04N 5/783 | 725/38 |
| 2009/0276821 A1* | 11/2009 | Amento | H04N 21/44226 | 725/116 |
| 2010/0080305 A1* | 4/2010 | Guo | H04N 21/4382 | 375/E7.279 |
| 2010/0091888 A1* | 4/2010 | Nemiroff | H04N 19/115 | 375/E7.154 |
| 2010/0100921 A1* | 4/2010 | Olson | H04N 21/643 | 725/118 |
| 2011/0037902 A1 | 2/2011 | Salinger et al. | | |
| 2011/0222669 A1* | 9/2011 | Buriano | H04L 65/752 | 379/32.01 |
| 2012/0042091 A1* | 2/2012 | McCarthy | H04N 21/812 | 709/231 |
| 2012/0116758 A1* | 5/2012 | Murgia | G10L 19/24 | 704/226 |
| 2013/0028121 A1* | 1/2013 | Rajapakse | H04L 65/75 | 370/252 |
| 2013/0044803 A1* | 2/2013 | Fisher | H04N 21/8455 | 709/231 |
| 2013/0089140 A1* | 4/2013 | Kudana | H04N 19/152 | 375/240.03 |
| 2013/0340023 A1* | 12/2013 | Yoshimoto | H04N 21/6375 | 725/116 |
| 2014/0013342 A1* | 1/2014 | Swan | H04N 21/4821 | 725/92 |
| 2014/0233587 A1* | 8/2014 | Liu | H04L 47/70 | 370/468 |
| 2014/0331270 A1* | 11/2014 | Olson | H04N 21/6168 | 725/149 |
| 2015/0082366 A1* | 3/2015 | French | H04N 21/6371 | 725/116 |
| 2015/0189394 A1* | 7/2015 | French | H04L 65/611 | 725/109 |
| 2016/0165266 A1* | 6/2016 | Bocharnikov | H04N 21/242 | 725/109 |
| 2016/0205424 A1* | 7/2016 | Ramsdell | H04N 21/23614 | 725/32 |
| 2016/0261896 A1* | 9/2016 | Bocharnikov | H04N 21/23424 | |
| 2016/0295254 A1* | 10/2016 | Chen | H04N 21/23406 | |
| 2017/0026710 A1* | 1/2017 | Olson | H04L 12/2801 | |
| 2017/0111686 A1* | 4/2017 | Quere | H04N 21/8547 | |
| 2017/0302378 A1* | 10/2017 | Mutalik | H04L 12/2856 | |
| 2018/0288829 A1* | 10/2018 | Palle | H04L 67/1001 | |
| 2018/0295050 A1* | 10/2018 | Lee | H04L 43/04 | |
| 2019/0014050 A1* | 1/2019 | Wang | H04L 49/9005 | |
| 2019/0116057 A1* | 4/2019 | Colson | H04L 12/2801 | |
| 2019/0182555 A1* | 6/2019 | Olson | H04N 7/102 | |
| 2019/0207690 A1* | 7/2019 | Mäki | H04Q 11/00 | |
| 2019/0327499 A1* | 10/2019 | Poli | H04N 21/2353 | |
| 2020/0145710 A1* | 5/2020 | Poli | H04N 21/2221 | |
| 2022/0053491 A1* | 2/2022 | Sevindik | H04L 27/0002 | |

\* cited by examiner

Network Information Table

| Syntax | No.of bits | Identifier |
|---|---|---|
| network_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   network_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   network_descriptors_length | 12 | uimsbf |
|   for(i=0;i<N;i++){ | | |
|     descriptor() | | |
|   } | | |
|   reserved_future_use | 4 | bslbf |
|   transport_stream_loop_length | 12 | uimsbf |
|   for(i=0;i<N;i++){ | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for(j=0;j<N;j++){ | | |
|       descriptor() | | |
|     } | | |
|   } | | |
|   CRC_32 | 32 | rpchof |
| } | | |

FIG. 2

Event Information Table

| Syntax | No.of Bits | Identifier |
|---|---|---|
| event_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for(i=0;i<N;i++){ | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for(i=0;i<N;i++){ | | |
|       descriptor() | | |
|     } | | |
|   } | | |
|   CRC_32 | 32 | rpchof |
| } | | |

FIG. 3

| Tuning Triplet for QAM Video | | | | |
|---|---|---|---|---|
| Service | MPTS | QAM | DAA Distr | Comments |
| | | | | |
| BCST 1 | A | BA-17 | Global | National/ Off-air |
| BCST 2 | A | BA-17 | Global | National/ Off-air |
| BCST 3 | A | BA-17 | Global | National/ Off-air |
| BCST 4 | B | BA-18 | Global | National/ Off-air |
| BCST 5 | B | BA-18 | Global | National/ Off-air |
| BCST n | C | BA-23 | Global | National/ Off-air |
| | | | | |
| 1-Az | Z1-A | BA-20 | AdZone1 | Ad Zone |
| n-Az | Z1-B | BA-40 | AdZone1 | Ad Zone |
| | | | | |
| PEGx1 | PEGx-A | BA-15 | PEGx | PEG |
| PEGxn | PEGx-A | BA-15 | PEGx | PEG |
| | | | | |
| Sw1 | Switched | BA-158 | NCST X0 | Switched |
| Sw2 | Switched | BA-158 | NCST X0 | Switched |
| Swn | Switched | BA-158 | NCST X0 | Switched |
| | | | | |
| VOD1 | VOD | BA-25 | NCST X0 | VOD QAM |
| VOD2 | VOD | BA-26 | NCST X0 | VOD QAM |
| .... | VOD | BA-27-31 | NCST X0 | VOD QAM |
| VOD8 | VOD | BA-32 | NCST X0 | VOD QAM |
| | | | | |

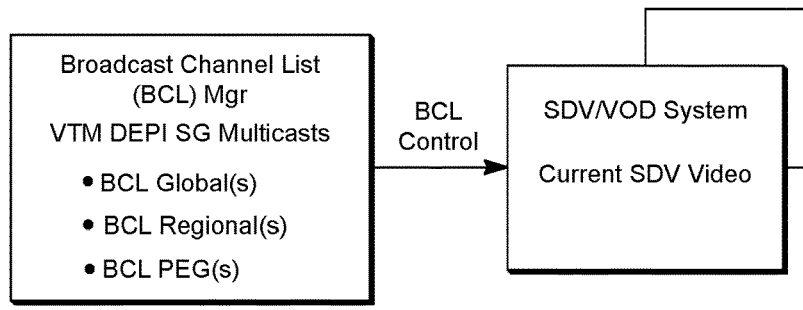

FIG. 6A

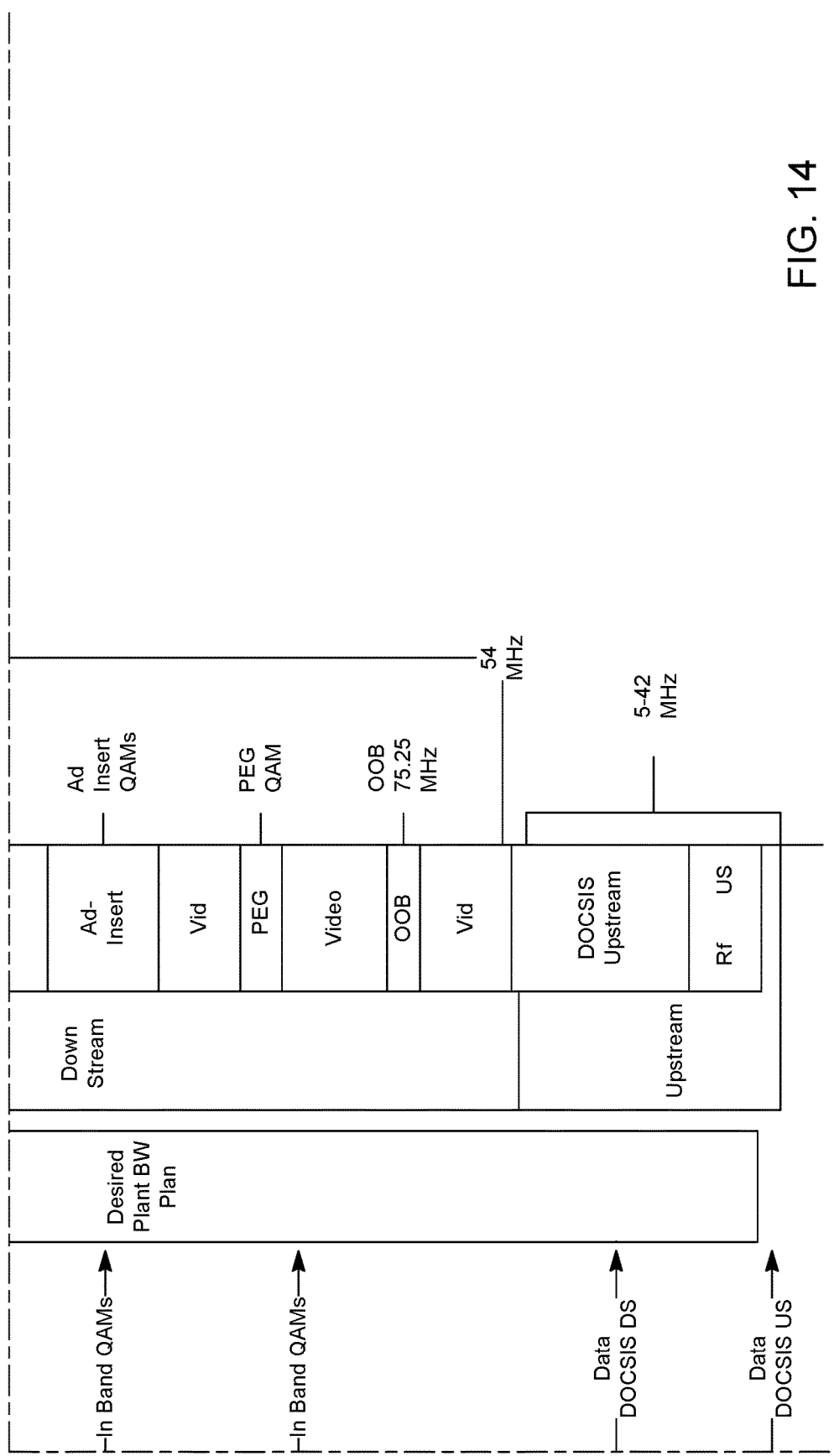

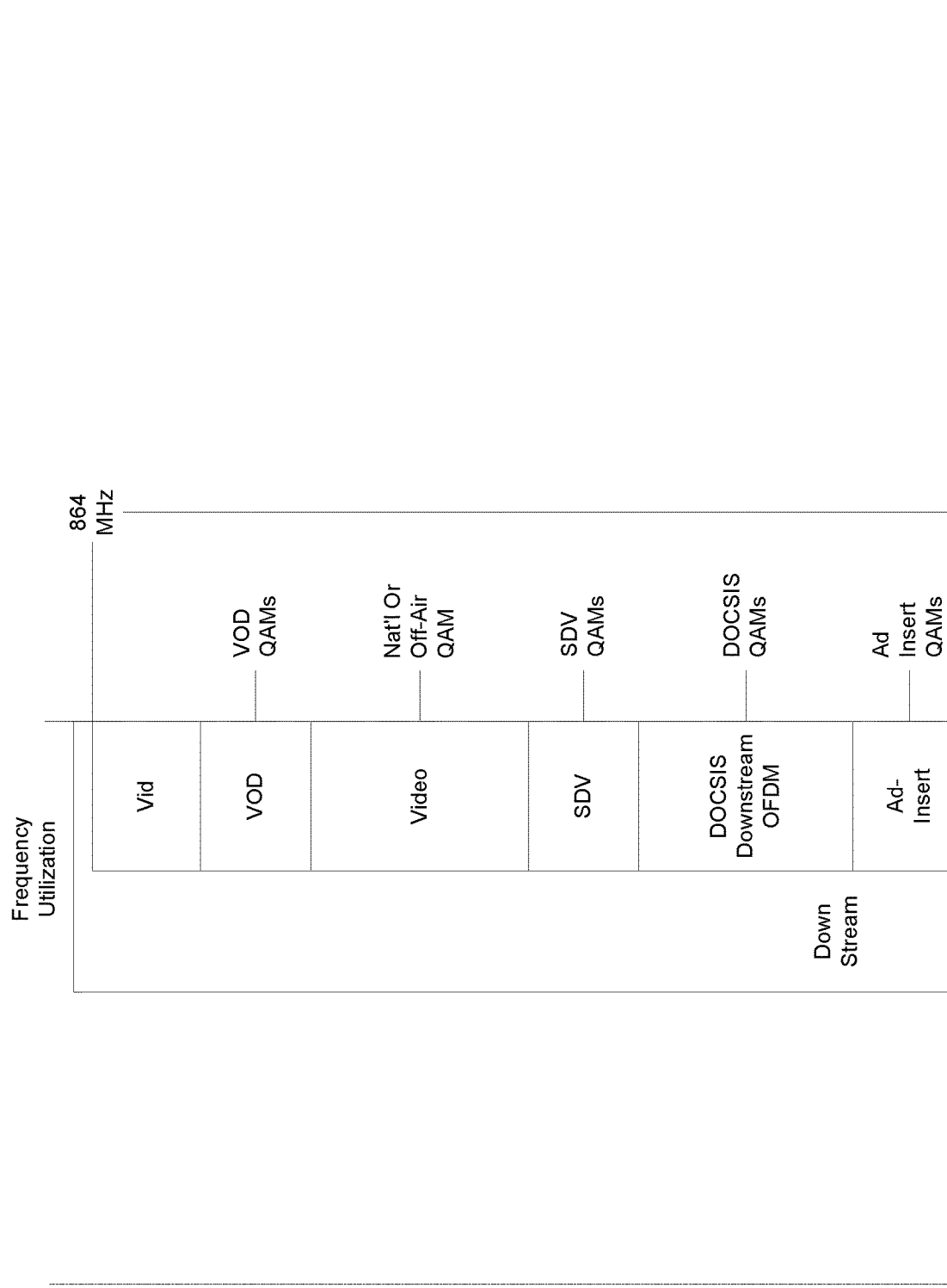

1630

Normal Channel Map (From Controller)

Virtual Channel Map Town X (1 Of ~100 VCMs On DAC)

| Service | MPTS | QAM | DAA Distr | Comments |
|---|---|---|---|---|
| OOB | OOB | QPSK | OOB DS | Comment Channel |
| BCST 1 | A | EIA-17 | Global | National/Off-Air |
| BCST 2 | A | EIA-17 | Global | National/Off-Air |
| BCST 3 | A | EIA-17 | Global | National/Off-Air |
| BCST 4 | B | EIA-18 | Global | National/Off-Air |
| BCST 5 | B | EIA-18 | Global | National/Off-Air |
| BCST 6 | C | EIA-23 | Global | National/Off-Air |
| 1-Az | Z1-A | EIA-20 | AdZone1 | AdZone |
| n-Az | Z1-B | EIA-40 | AdZone1 | AdZone |
| PEGx1 | PEGx-A | EIA-15 | PEGx | PEG |
| PEGxn | PEGx-A | EIA-15 | PEGx | PEG |
| Sw1 | Switched | EIA-158 | NCST X0 | Switched |
| Sw2 | Switched | EIA-158 | NCST X0 | Switched |
| Swn | Switched | EIA-158 | NCST X0 | Switched |
| VOD1 | VOD | EIA-25 | NCST X0 | VOD QAM |
| VOD2 | VOD | EIA-25 | NCST X0 | VOD QAM |
| ... | VOD | EIA-27-31 | NCST X0 | VOD QAM |
| VOD8 | VOD | EIA-32 | NCST X0 | VOD QAM |

| Remove OOB, Move All Video To EIA 158 |

High Split Map (From Controller)

Virtual Channel Map Town X (1 Of ~100 VCMs On DAC)

| Service | MPTS | QAM | DAA Distr | Comments |
|---------|--------|---------|-----------|------------------|
| BCST 1  | A      | EIA-158 | Global    | National/Off-Air |
| BCST 2  | A      | EIA-158 | Global    | National/Off-Air |
| BCST 3  | A      | EIA-158 | Global    | National/Off-Air |
| BCST 4  | B      | EIA-158 | Global    | National/Off-Air |
| BCST 5  | B      | EIA-158 | Global    | National/Off-Air |
| BCST n  | C      | EIA-158 | Global    | National/Off-Air |
| 1-Az    | Z1-A   | EIA-158 | AdZone1   | AdZone           |
| n-Az    | Z1-B   | EIA-158 | AdZone1   | AdZone           |
| PEGx1   | PEGx-A | EIA-158 | PEGx      | PEG              |
| PEGxn   | PEGx-A | EIA-158 | PEGx      | PEG              |
| Sw1     | Switched | EIA-158 | NCST X0 | Switched         |
| Sw2     | Switched | EIA-158 | NCST X0 | Switched         |
| Swn     | Switched | EIA-158 | NCST X0 | Switched         |
| VOD1    | VOD    | EIA-158 | NCST X0   | VOD QAM          |
| VOD2    | VOD    | EIA-158 | NCST X0   | VOD QAM          |
| ...     | VOD    | EIA-158 | NCST X0   | VOD QAM          |
| VOD8    | VOD    | EIA-158 | NCST X0   | VOD QAM          |

FIG. 16C

Remove Selected Services, Move All Video > 258MHz — 1650

Modified High Split Channel Map

Virtual Channel Map Town X (1 Of ~100 VCMs On DAC)

| Service | MPTS | QAM | DAA Distr | Comments |
|---|---|---|---|---|
| BCST 1 | A | EIA-35 | Global | National/Off-Air |
| BCST 3 | A | EIA-35 | Global | National/Off-Air |
| BCST 4 | B | EIA-36 | Global | National/Off-Air |
| BCST 5 | B | EIA-36 | Global | National/Off-Air |
| BCST n | C | EIA-40 | Global | National/Off-Air |
| 1-Az | Z1-A | EIA-42 | AdZone1 | AdZone |
| n-Az | Z1-B | EIA-43 | AdZone1 | AdZone |
| PEGx1 | PEGx-A | EIA-38 | PEGx | PEG |

Optionally, Carry Switched If CPE Client Capable

| Sw1 | Switched | EIA-158 | NCST X0 | Switched |
| Sw2 | Switched | EIA-158 | NCST X0 | Switched |
| Swn | Switched | EIA-158 | NCST X0 | Switched |

| VOD1 | VOD | EIA-50 | NCST X0 | VOD QAM |
| VOD2 | VOD | EIA-51 | NCST X0 | VOD QAM |
| ... | VOD6-7 | EIA-52-56 | NCST X0 | VOD QAM |
| VOD8 | VOD | EIA-57 | NCST X0 | VOD QAM |

| FIG. 16A | FIG. 16B | FIG. 16C | FIG. 16D |

SYSTEM FOR CHANNEL MAP DELIVERY FOR HI SPLIT CABLE NETWORKS

CROSS REFERENCE TO RELATED APPLICATIONS

This application is a continuation of U.S. patent application Ser. No. 17/732,377, filed Apr. 28, 2022, which claims the benefit of U.S. Provisional Patent Application Ser. No. 63/183,382 filed May 3, 2021.

BACKGROUND

The subject matter of this application relates to channel map delivery for on-plant spectrum manipulation to support network evolution to increase data bandwidth such as moving to high split cable networks.

Modern CATV delivery systems provide to their customers not only the broadcast television content (video plane) historically associated with cable delivery networks, but also data services (data plane) such as Internet services, certain video-on-demand, and other data communications either desired or necessary for providing customer services. The evolution of the architectures to deliver these respective video plane and data plane services has traditionally been disconnected, since traditional radio frequency (RF) combiner networks in a headend allowed video and data streams to have a fair degree of independence during delivery of both video and data. The CATV delivery systems provide channel mappings for broadcast video services to customer premise equipment, such as various forms of set top boxes. As the CATV delivery systems have evolved, including distributed and non-distributed architectures, different bands of frequencies are used for upstream and downstream traffic, which results in managing the desired channel mapping for broadcast video services across a variety of different customer premise equipment to be problematic.

What is desired, therefore, is an efficient manner of managing the channel mapping for QAM based video services, including broadcast and narrowcast QAM video services across different customer premise equipment with a footprint size that is closer in network segment size to the data services delivery than current video services delivery (e.g., especially broadcast).

BRIEF DESCRIPTION OF THE DRAWINGS

For a better understanding of the invention, and to show how the same may be carried into effect, reference will now be made, by way of example, to the accompanying drawings, in which:

FIG. 2 illustrates a network information table.

FIG. 3 illustrates an event information table.

FIGS. 6A-6C illustrate each service placed on the frequency spectrum (one part of tuning triplet=frequency, modulation mode, MPEG service number).

FIGS. 14A-14F illustrate a visualization of video services delivery within the headend and in home frequency plan (low-split)

FIGS. 15A-14F illustrate a video management visualization

FIGS. 16A-16D illustrate SCTE-65 based channel map representation of a universal channel map to a realized edge map intended to cover a subset of the provisioning controller footprint

DETAILED DESCRIPTION

One exemplary type of cable television system is a distributed access architecture (DAA). Distributed access architectures may include Remote-Physical (R-PHY) architectures that relocate physical (PHY) devices downstream into the network while retaining the control layer (MAC) layer in the head end, as well as R-MACPHY architectures that relocate both the PHY and MAC layers downstream into the network and R-OLT architectures that relocate optical line terminals (OLT) in passive optical networks (PON) to a remote location, as well as many other variations. An R-PHY architecture, which remotely locates a physical device (PHY) that converts optical digital signals to radio frequency (RF) signals such as a quadrature amplitude modulated (QAM) signal, will be used to describe the embodiments disclosed in this specification, but those of ordinary skill in the art will appreciate that the disclosures herein may be employed with other DAA architectures and/or remote devices. Further, the embodiments disclosed herein in this specification are likewise applicable to non-DAA architectures. Exemplary embodiments may include a video configuration for video delivery at various points in a video stream construction. The system may include a management system to facilitate configuration changes to headend distributed access video generation elements and/or remote physical devices.

Figure 1:
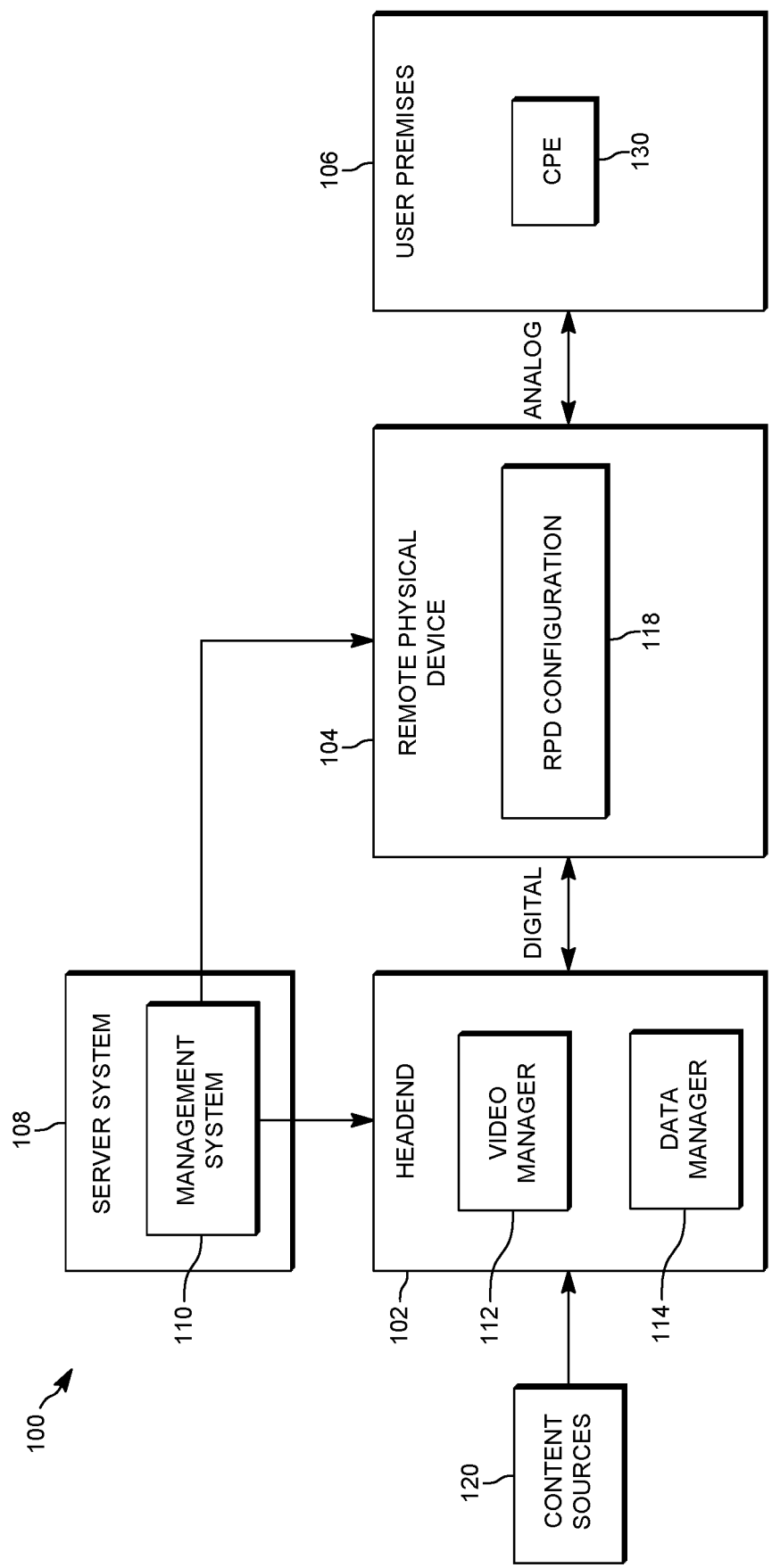
FIG. 1 illustrates an exemplary system for delivering data and video in a distributed architecture.

FIG. 1 depicts a simplified system 100, simply for purposes of illustration, capable of being used to implement a technique for delivering data and video according to some embodiments. The system 100 includes a headend 102, a remote physical device 104, user premises 106, and a server system 108. The system 100 may be a distributed access architecture as discussed above where digital optical components are used to replace analog optical components between the headend 102 and the remote physical device 104, which allows the physical components to perform the analog to digital (and RF) conversion and to be configured deeper in the network, closer to the user premises 106. The headend 102 may deliver video and data to user premises 106 using the remote physical device 104. Although a single user premises 106 and a single remote physical device 104 are shown, the remote physical device 104 may be coupled to multiple user premises 106. Additionally, the system 100 may include multiple remote physical devices 104 that are coupled to different sets of user premises 106. It is noted that traditional non-DAA analog distribution system may continue to coexist with the DAA illustrated.

The headend 102 may receive video and data from content sources 120. A video manager 112 may manage the video delivery to the user premises 106 and a data manager 114 may manage the data delivery to the user premises 106. In some embodiments, the headend 102 may deliver both video and data to the user premises 106 via the same frequency spectrum. For example, the RF frequency spectrum may include an upstream frequency range and a downstream frequency range. The downstream frequency range may deliver both video and data downstream from the headend 102 to the user premises 106 at different frequencies. Similarly, the upstream frequency range delivers video and data upstream from the user premises 106 to the headend 102. The headend 102 may send the video and data signal via a digital network, such as via an optical signal. The remote physical device 104 may receive the digital signal and convert the signal to analog, such as to an RF signal. In the upstream direction, the remote physical device 104 receives analog video or data signalling from the user premises 106, converts the analog video or data signalling to a digital signal, and sends the digital signal to the headend 102.

The video manager 112 may use an RPD configuration 118 to insert video and data into a digital signal that is sent to the remote physical device 104. The remote physical device 104 then converts the video into analog at the corresponding frequencies and sends the analog signal to the user premises 106.

The RPD configuration 118 may be a list of addresses that pertain to video delivery. For example, the addresses may be multicast addresses for video streams. The video manager 112 uses information that is associated with video streams received at the headend 102 to determine which video to insert into the digital signal that is sent to the remote physical device 104. For example, the headend 102 receives various video streams based on a legacy video delivery through a legacy video network (e.g., a network that creates video streams and performs the QAM RF conversion at the headend 102). The video manager 112 inserts the appropriate video into the digital signal with information about the desired frequency placement for the specific RPD configuration 118 and provides the video to the specific remote physical device 104.

The server system 108 includes a management system 110 that can define the suitable configuration for the video delivery for the headend 102. The management system 110 may also define the suitable configuration of the RPD configuration 118 for the video delivery for the remote physical device 104.

As it may be observed the user premises 106 may include consumer premises equipment (CPE) 130 in the form of cable modems and/or set top boxes and/or television with decrypting card (or otherwise) at the user premises 106. Such consumer premises equipment are distributed across cable systems ranging from thousands of devices to hundreds of thousands of devices to tens of millions of devices to receive and render broadcast video services. In some cases, such consumer premises equipment may be one way receiving devices that are not capable of transmitting data or otherwise to the network. In other cases, such consumer premises equipment may further be capable of transmitting data or otherwise to the network. In yet other cases, such consumer premises equipment may be cable of receiving other types of video streams, such as those suitable for linear broadcasts, conditional access, video on demand, switched digital video, and/or advertisement insertion.

The headend 102 in combination with the remote physical device 104 are often capable of providing (1) video stream distributions where one or more of the video streams are constructed based on selections by the viewer, in a manner together with, (2) the broadcast of more traditional video streams, such as legacy networks (e.g., ABC, CBS, NBC, CNN, PBS, etc.) where the video streams are not constructed based on selections by the viewer. Both video streams are provided by the headend 102 to the remote physical device 104 and to the user premises as an analog signal on a coaxial cable. Accordingly, the video stream is provided by the headend 102 to the user premises 106 and the CPEs 130. When the viewer selects a channel in a traditional broadcast video stream the consumer premises equipment tunes to the selected channel of the traditional broadcast video stream. In this manner, the headend 102 is capable of providing traditional broadcast video streams to the consumer premises equipment that are not capable of making particular requests. In the event that the consumer premises equipment is capable to making requests to the headend 102 for particular video streams, the requested video stream may be provided to the consumer premises equipment through a coordination of video stream placement and consumer premises equipment tuning by a system, such as a switched digital video system.

The initial configuration of the system, including the headend 102 and the remote physical device 104, to accommodate the distribution of traditional broadcast video streams is complicated, time consuming, and prone to error. The complications may be further aggravated by the available physical space at the headend, power constraints at the headend, and data demands at the headend (i.e., with traditional RF combiner/analog optics/nodes and without a distributed access architecture). Modification of the existing configuration of the system, including the headend 102 and the remote physical device 104, to accommodate the modified distribution of traditional broadcast video streams (i.e., to a partial distributed access architecture or other distribution) is increasingly complicated, time consuming, and prone to error. To achieve such modification of the existing configuration, one or more computing devices of the headend, such as one or more servers, needs to be updated to include updated configuration settings, each of which may be different for different portions of the system. For example, this may involve updating a relatively small group of such headend computing devices. To further achieve such modification of the system, each of the respective remote physical devices 104 needs to be updated to include the updated configuration settings, each of which may be different for different portions of the system, and each of which include updated settings that are consistent with the particular updated headend 102 from which it receives video. For example, this may involve updating hundreds of such remote physical devices 104. The management of a particular system among the multitude of different remote physical devices, with varying content services being provided to each of the different remote physical devices, is a burdensome task. Moreover, as the scale of the number of remote node devices increases, the management becomes increasingly more burdensome.

The operator of the cable systems regularly changes their agreements with content providers of the channel lineup which in turn requires updating selected portions of the computing devices of the headend and the corresponding remote physical devices, which often takes weeks to months to achieve across a region or geographic area(s). Further, the updating of the channel maps of the customer premise equipment should be performed in a manner, such that all of the devices include the updated channel mapping even when different customer premise equipment having different operating characteristics. Moreover, the updating of the computing devices of the headend, the corresponding remote physical devices, and/or the consumer premise equipment, should be performed in a suitable sequence, often during maintenance windows, so that the system remains operational during the modification process.

Many cable systems are being modified to include DOCSIS 3.1 (Data Over Cable Service Interface Specification 3.1), incorporated by reference herein in its entirety, which may require modification of the channel lineup and associated computing devices of the headend along with the corresponding remote physical devices, which may vary based upon different geographic regions served by the cable system, to create room for 32-QAM/192 MHz OFDM block(s) or 96 MHz OFDM half-blocks downstream and/or OFDMA upstream channels.

The channel maps, which may vary based upon different geographic regions served by the cable system, may include, for example, (1) the logical cable channel (e.g., 122); (2) physical channel-subchannel of the cable system (e.g., 86-122); and (3) the station name (e.g., Fine Living), that should be applied at a given point within a non-distributed cable system, or at the remote physical devices in the case of a distributed cable system.

The cable system may include narrowcast services, provided to groups, that includes video services that are either switched digital video (SDV) or on-demand digital video (VOD). The specific placement of the narrowcast service(s) on a QAM frequency and assignment of service number(s) are subject to the underlying SDV or VOD sub-system. In general, instead of combing all the channels into one programming video stream throughout the network, switched digital video (SDV) only groups together a selection of the most popular channels for a network wide video stream that are not under control of the SDV controller. Less popular channels that are under control of the SDV controller are provided in a video stream to a customer or group of customers only when a customer tunes to that channel. As the popularity of selected channels changes over time, the system switches in the more popular channels and switches out the less popular channels in the network-wide broadcast. The determination of what content is broadcast network-wide and what content is allowed to be switched into a video stream may be based upon the customer usage for geographic regions, selected portions of the distribution network, selected remote physical devices, etc.

It is desirable to facilitate modification and scaling of the configuration structures of distributed access architecture (DAA) and for non-distributed access architecture for the distribution of traditional broadcast video streams. In many cases, the signaling between the headend and the remote physical devices uses a remote downstream external PHY interface as the interface between the headend and the remote physical device. The remote downstream external PHY interface (DEPI) is an Internet protocol pseudowire between the MAC and PHY that contains both a data path for DOCSIS frames, video packets, and OOB packets, as well as a control path for setting up, maintaining, and tearing down sessions. The data path may be DEPI wrapped groups of multi program transport stream (MPTS) video streams distributions to groups of remote physical devices. The multi program transport stream (MPTS) may be a MPEG-2 compliant transport stream that contains more than one video (or audio) program. A single program transport stream (SPTS) may be a MPEG-2 compliant transport stream that contains one video (or audio) programs.

It is also desirable to facilitate modification and scaling of the configuration structures of non-distributed access architecture (non-DAA) for the distribution of traditional broadcast video streams. The non-DAA typically includes radio-frequency combiners for the inputs and outputs of QAM or QPSK modulated signals or in some cases direct Internet protocol.

One principal perceived limitations in the modification and scaling of the configuration structures of a cable system is the complexity of simultaneously configuring disparate systems and the limitations of the creation of the component multi-program transport stream broadcast video services (which relate to legacy video infrastructure and alignment of channel maps distributed from the customer premises equipment provisioning controller-often also referred to as the conditional access controller) that ultimately form the basis of the broadcast and narrowcast multi-program transport stream video stream distributions. It is noted that switched digital video groups are driven by client tuning (i.e., these are mapped to specific physical quadrature amplitude modulated channels) while broadcast video services are not driven by client tuning. As previously noted, the cable system may include a distributed access architecture that includes R-PHY (i.e., remote PHY), R-MAC PHY (i.e., remote MAC and PHY), R-OLT (i.e., remote optical line terminal), etc., (generally referred to herein as remote physical devices (RPD)) where digital optics are used to replace traditional HFC (i.e., hybrid fiber coaxial) analog optics to the nodes. In other words, downstream external-phy interface (DEPI) wrapped groups of multi-program transport stream (MPTS) video streams distributions to groups of remote physical devices (RPDs).

For legacy and non-legacy architectures it may be desirable to define the linear broadcast video services and the multi-program transport stream configuration at various points in the video stream construction to facilitate modification and scaling of the configuration of a cable system. Within the video a suitable packet identifier (PID) may be inserted together with leveraging switched architecture and protocols that are applied to broadcast services to limit the information provided by an operator having a primary function to configure either the legacy video system or the evolved distributed access architecture (DAA). Broadcast services refer to video services that are always present at the viewer's device (traditionally this refers to non-switching services that are carried on the same QAM frequencies and use a MPEG-2 transport stream service number(s) defined in system information/channel maps or network information tables (see FIG. 2)/event information tables (see FIG. 3) (DVB) (see, EN 300 468 v 1.3.1 (1998-02) "Digital Video Broadcasting (DVB); Specification for Service Information (SI) in DVB systems" incorporated by reference herein in its entirety). Channel maps and event information tables of ANSI/SCTE 65, "Service Information Delivered Out-Of-Band For Digital Cable Television" (2016), may likewise be used, incorporated by reference herein in its entirety. The PID may be a unique integer value used to identify elementary streams of a program in a single or a multi-program transport stream, including for example, emergency alert data stream, consumer premise equipment (e.g., set-top boxes, etc.) control streams (e.g., digital transport adapter or digital video broadcast), switched digital video mini-carousel data streams, network or system information data streams, guide data streams, enhanced television binary interchange format data streams, and other data streams.

Figure 4:
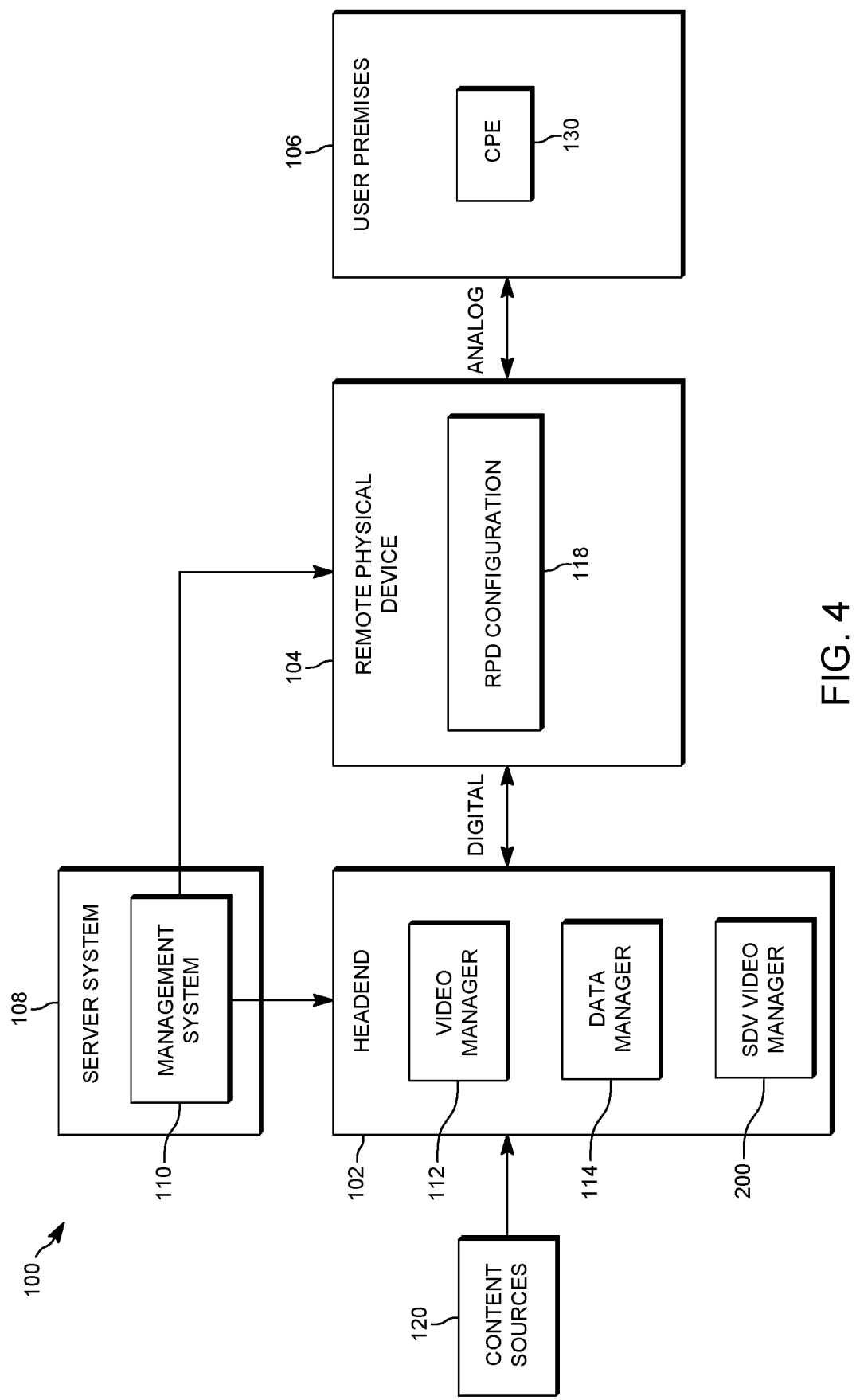
FIG. 4 illustrates a modified system for delivering data and video in a distributed architecture with switched digital video.

Referring to FIG. 4, the switched architecture, which may include switched digital video (SDV) 200 with the headend 102 that may include an IP unicast or multicast stream containing MPEG-2 transport stream packets which includes a group of components used for the control plane of R6 and/or remote procedure call (RPC) switching control protocols. The switching control protocols included within switch digital video are preferably used to manage the broadcast MPTS in a QAM/non-DAA (no DEPI wrapping) and/or in a (R-PHY with DEPI wrapping) linear broadcast video service. The management preferably includes the configuration information of the computing devices of the headend 102 and the R-PHY nodes. The switching control protocols may be session control that relates to the R6 and RPC control protocols included with switched digital video services. Other protocols may likewise be used depending on the particular video service included.

Out of Band Control Channel(s) and RF Upstream, if present, may be handled outside of the Session Control of Broadcast Services architecture or be included as a specific out of band (OOB) instance within the distributed access architecture (DAA) context. The out of band (OOB) control channel may provide Conditional Access System or DRM System linkage to the associated channel maps and distribution management coordinated between broadcast channel lists and out of band (OOB) control.

Figure 5:
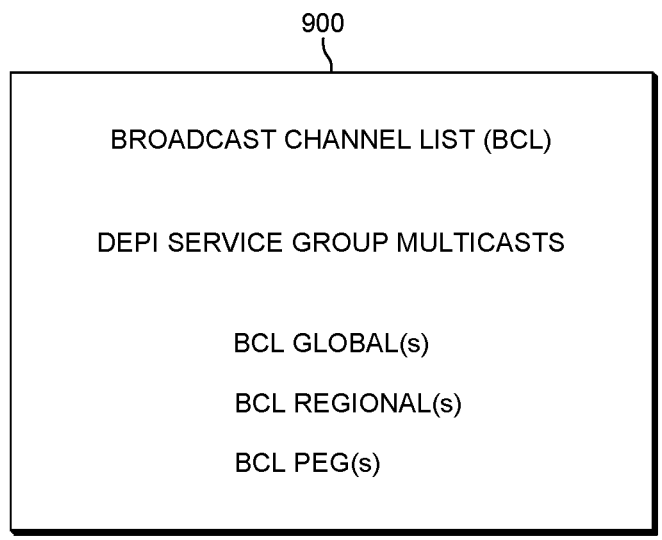
FIG. 5 illustrates a simplified broadcast channel list.

Referring to FIG. 5, a broadcast channel list 900 may be provided or otherwise created with sufficient information that allows the switched digital video protocols (e.g., R6 or RPC) to be used to create the MPTS streams in the absence of consumer premises equipment with the client tuning to those services. The broadcast channel list(s) 900 is a list of broadcast video services that remain part of the actively transmitted video services whether a subscriber tuner within the switched digital video (SDV) service group (customer premise equipment) is tuned to the service. The SDV Service Group is a set of QAM channels with actively managed switched services distributed to a group of subscribers defined by the node(s) or RF combiner physical distribution. In some cases, the SDV services may be combined with video on demand (VOD) services to manage both service types within the SDV service group. Depending on system architecture, these may include associations to Legacy Controller System Information with sufficient detail (e.g., frequency, modulation, program/service number, etc.) to align broadcast services MPTS under the control of a Switched Video System to the Service Information from the Legacy Controller. The Legacy Controller is the set-top box or customer premise equipment provisioning server, the conditional access system, or other system that creates the system information (i.e., SCTE-65 or DVB NIT and other related DVB tables defining the broadcast services on the network) for the customer premise equipment (CPE) (e.g., set top box). In some embodiments, the service related information may be locked to an existing channel map. In some embodiments (with an enabled client population), the service information is not locked to a channel map, however, the services may be maintained without client communications.

In one embodiment the system automatically creates broadcast linear QAMs (services always on) that align to channel map tuning triplets (frequency, modulation mode, program/service number). In this manner, the broadcast channel list may be automatically created or otherwise use the channel map. One advantage is that it does not require manual configurations on the edge QAM or on the MPTS (pre-DEPI wrapped). This allows for fewer maintenance windows for moving video around on the spectrum to make room for additional data services. No set-top box or digital television adapter client changes are necessary for this embodiment, but channel map changes may be configured at a digital addressable controller (or digital network control system or digital video broadcasting controller(s)).

Other embodiments may support switching the services without alignment to specific channel maps and edge QAM/DAA distributions. This may also require digital television adapter client changes and potentially set-top code from a channel map driven tune to process the mini-carousel to switched protocol for tuning. This evolution eases requirements on channel map configuration/operations. Other variants may provide for subscriber targeted advertising over QAM (e.g., within a Geographic Ad Zone).

In an exemplary embodiment, the starting anchor point for Switched System Broadcast MPTS creation on a given segment of a legacy video system is related to the service information distribution as reflected in the System Information. The system information may be, for example, SCTE-65 or DVB NIT or other related DVB tables defining the broadcast services on the network. Using the SCTE-65 standard as an example, the Carrier Definition Table frequencies are referenced in a Channel Map. The set of video service Source IDs identifying the same carrier definition table (CDT) Reference (which correlates to an electronics industries association (EIA) or a harmonically related coherent (HRC) channel frequency) comprise the set of services that will form the MPTS for that segment of the video network and that specific SCTE-65 (channel map) distribution. The various sets of MPTSs aimed at broadcast services will form the Broadcast Channel List. Services that are dynamically switched are also defined in the channel map, but typically have an EIA channel that might indicate it is not part of a defined MPTS (such as EIA-154 which corresponds to 999 MHz).

Figure 6B:
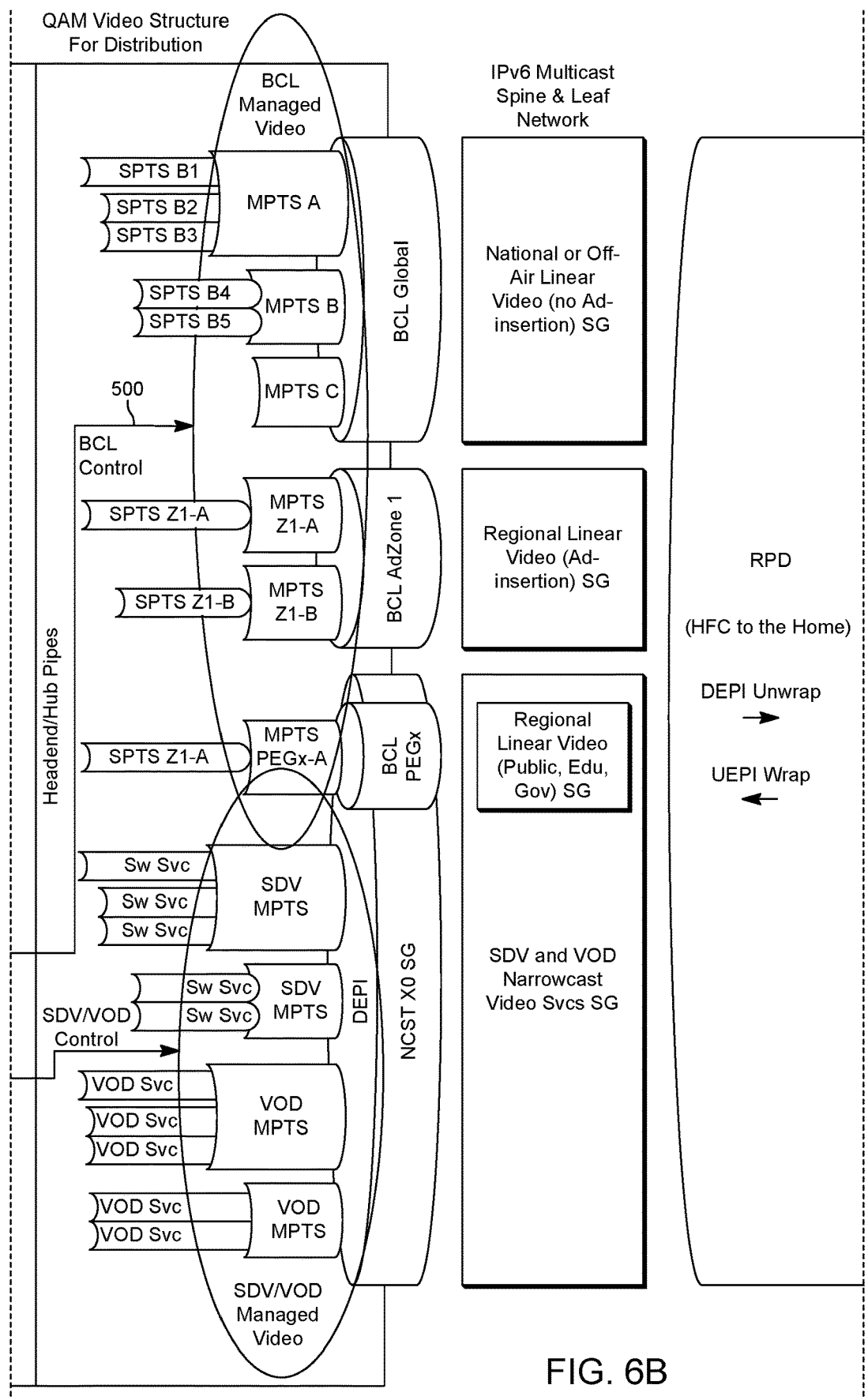
Figure 6C:
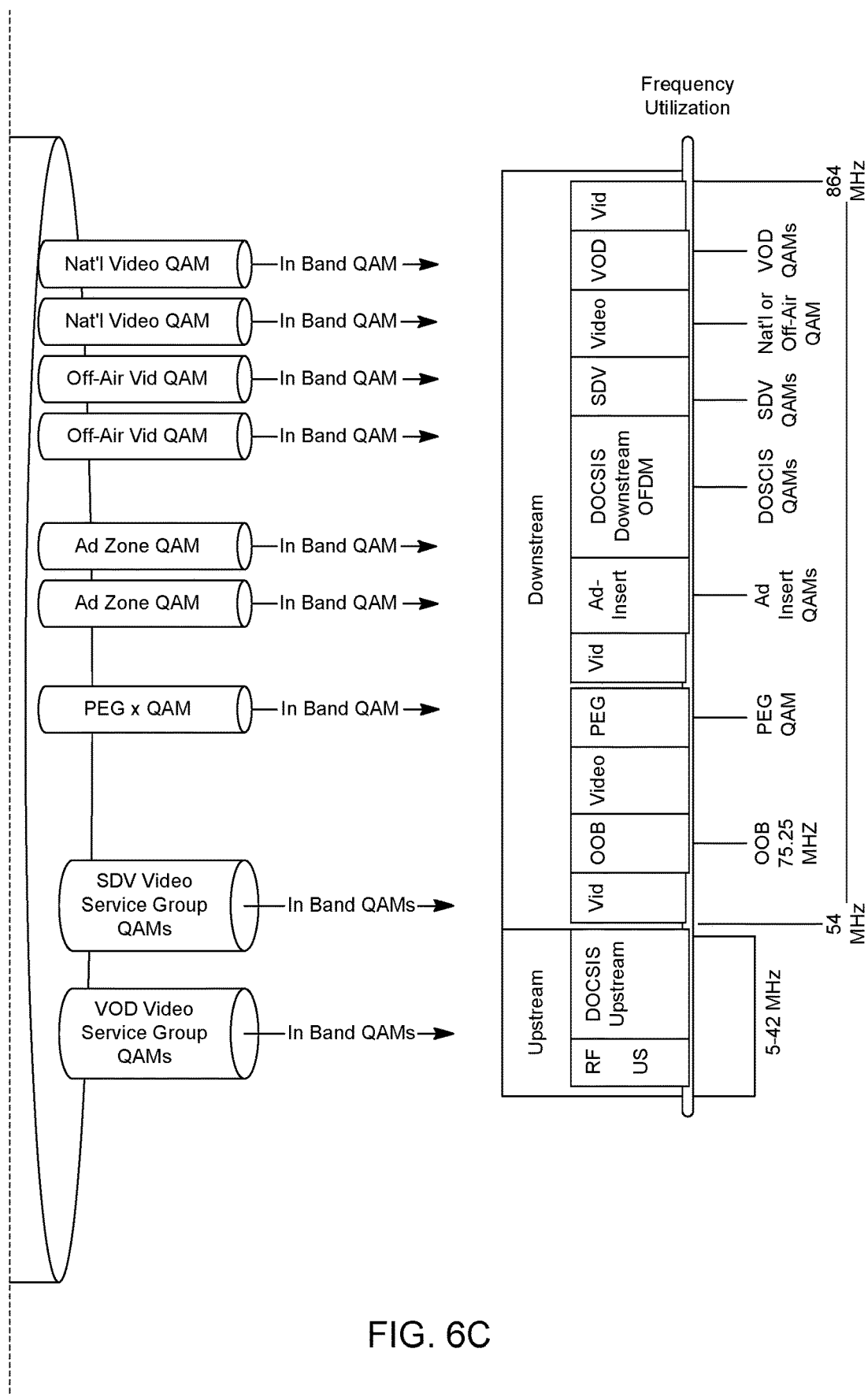

Referring to FIGS. 6A-6C, an exemplary representation of the tuning triplets (QAM Frequency, Modulation Mode, Service Number) for each service and where it may be placed on the frequency spectrum is illustrated. The lines 500 represent Broadcast Channel List Control of building up the Video MPTS that ultimately get realized as the Frequency Utilization on the right side. For Clarity, the Out of Band and Data Upstream and Downstream pieces in the Frequency Spectrum are not shown going through the RPD.

Figure 7:
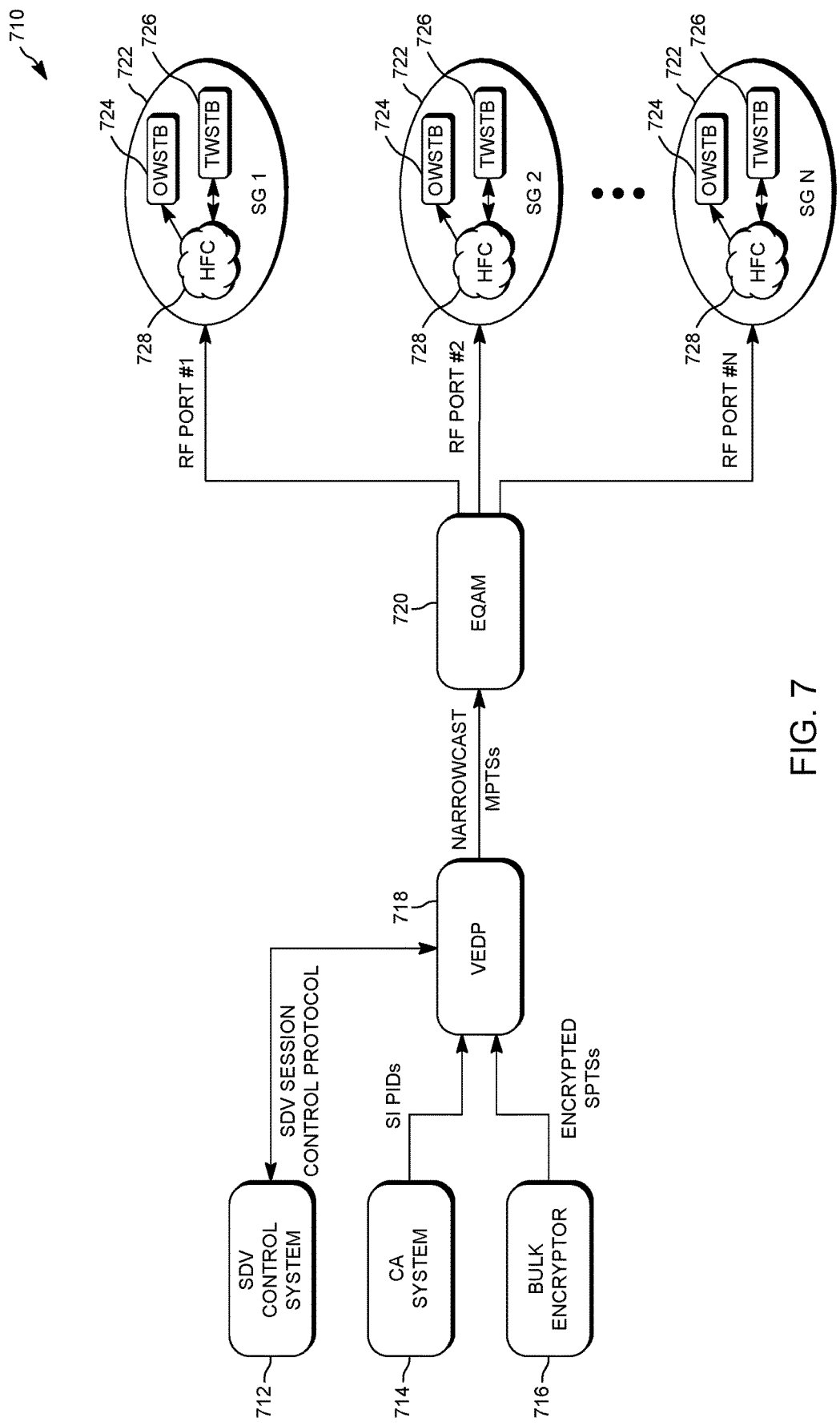
FIG. 7 illustrates a high-level block diagram of an example of a SDV system in a non-distributed architecture.

Referring to FIG. 7, an illustrative example of a SDV system 710 is shown for a non-distributed architecture system. The SDV system includes a SDV control system 172, a conditional access (CA) system 714, a bulk encryptor 716, a virtual edge device proxy (VEDP) 718, an edge device having a plurality of edge QAM modulators (EQAMs) 720, and a plurality of service groups 722. Each service group includes one-way set top boxes 724 and two-way set top boxes 726 that communicate with EQAMs 722 via one or more hybrid fiber co-axial (HFC) networks 728.

The SDV control system 712 communicates with the VEDP 718 via any suitable SDV session control protocol, such as the next generation on demand (NGOD) protocol. The SDV control system may include, for example, a management console, a SDV session manager, and/or an edge manager. The CA system 714 provides conditional access information to VEDP 718. Additionally, the CA system 714 provides system information (SI) in messages carried on Network (NET) packet identifiers (PIDs) streams, such as in-band NET PIDs, to the VEDP to support one-way set top boxes. The CA system 714 may include a Digital Addressable Controller (DAC) or similar Conditional Access/Video-CPE Provisioning Controller. The bulk encryptor 716 provides encrypted single program transport streams (SPTSs) to the VEDP 718.

The VEDP 718 is a universal proxy for EQAMs 720 supporting video narrowcast QAMs. The VEDP communicates with SDV control system 712 on behalf of EQAMs 720 and builds appropriate multiprogram transport services (MPTSs) from the encrypted SPTSs from bulk encryptor 716 for each narrowcast video QAM defined within EQAMs 720. Additionally, the VEDP 718 switches in dynamic broadcast services as controlled or commanded by the SDV control system 712. Moreover, the VEDP 718 receives NET PIDs (e.g., in-band SI) from CA system 714 and inserts and fixes those SI messages such that one-way set top boxes 724 can operate properly. For example, VEDP 718 delivers SI messages that are aligned with where the SDV system places those services available to the one-way set top boxes. The System Information messages generally are in-band, but out-of-band information streams may also be used. Additionally, the VEDP 718 configures the QAM channels containing services targeted to the one-way set top boxes to route the updated NET PIDs. The VEDP ensures that all QAM channels with the same narrowcast service group contains the same set of SI carried on NET PIDs.

The EQAMs 720 receives the narrowcast MPTSs and narrowcasts the MPTSs to service groups 722. The EQAMs include a plurality of radio frequency (RF) ports 730 that are connected to HFC network(s) 728. The service groups 722 include a plurality of one-way set top boxes 724 (e.g., digital television adapters) and two-way set top boxes 726.

One-way set top boxes 724 are incapable of notifying SDV control system 712 of active tuned services so SDV control system 712 must manage any service intended for one-way set top boxes 724 to always remain active and not switch out any service targeted for those set top boxes. In other words, the services provided to one-way set top boxes 724 are static or always available. However, the SDV control system 712 can still manage whether to place the above services so the placement of services in a QAM is still dynamically assigned by the SDV control system.

Figure 8:
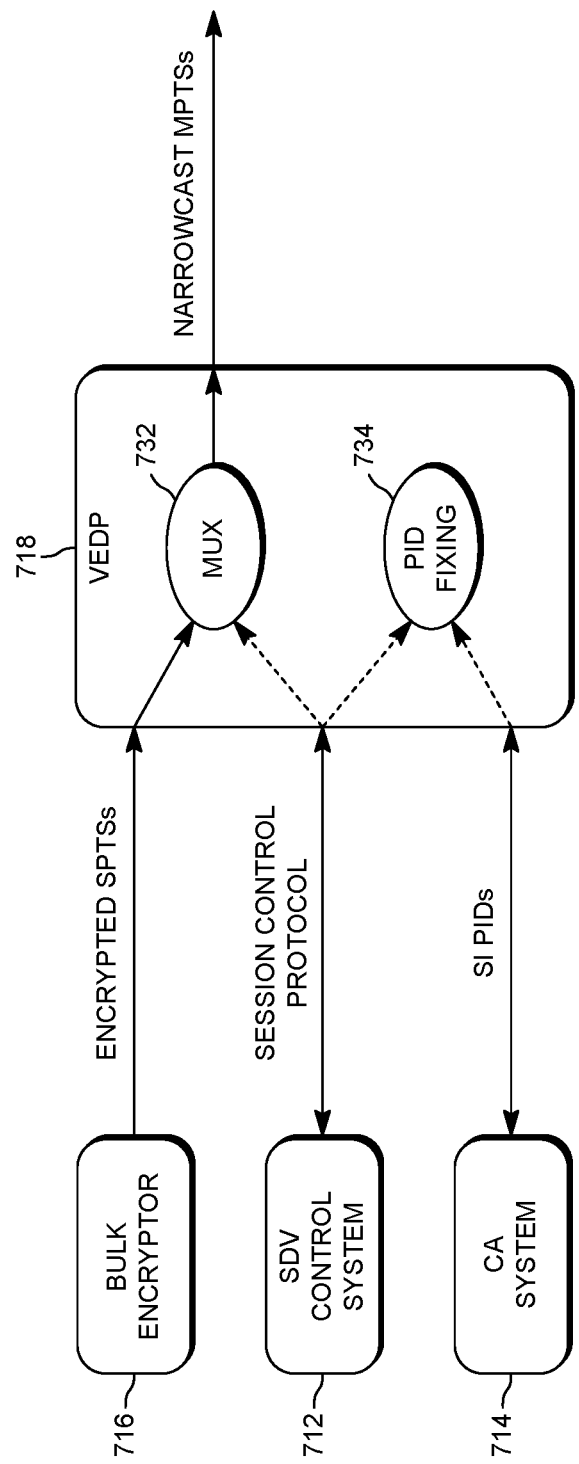
FIG. 8 illustrates a partial block diagram of the SDV system of FIG. 7.

Referring to FIG. 8, the interactions of VEDP 718 with other components of SDV system 710 are illustrated. The VEDP 718 includes a multiplexer (MUX) 732 and a PID update or fixing component 734. The MUX 732 receives encrypted SPTSs from bulk encryptor 716, such as via user datagram protocol (UDP), internet protocol (IP), and/or 10 gigabit Ethernet (10 GigE).

As part of the session set-up, the SDV control system 712 includes a source ID that uniquely identifies the services being routed. The source ID is also used to identify services within the SI carried on the NET PID. For example, PID fixing component 734 uses the source ID to fix and/or update service information in the NET PIDs. When one-way set top boxes 724 are digital television adapters (DTAs), the in-band service information is contained in the network PID carried on each in-band QAM with at least one static service intended for the one-way set-top. The SDV control system 712 may provide additional information to MUX 732 and/or PID fixing component 734, such as frequency and/or moving pictures expert group (MPEG) program number (PN)/service number (SN), etc.

The CA system 714 provides NET PIDs to PID fixing component 734, such as via user datagram protocol (UDP), internet protocol (IP), and/or 10 gigabit Ethernet (10 GigE). The NET PIDs may include a conditional access table (CAT), entitlement management message (EMM), network (NET) PID, electronic program guide (EPG), and set top box code download (CDL). The CAT includes information that is used by the set top boxes to decode the narrowcasted streams. The EMM defines access rights for each set top box and may be sent continuously to allow the set top boxes to continue to decode the narrowcasted streams as the encryption changes for those streams. The EPG are menu-based systems that provide the set top boxes with continuously updated menus that display scheduling information for current and upcoming programs. When one-way set top boxes 724 are DTAs, an example of in-band PIDs are shown in Table 1 below where the SI is carried on NET.

TABLE 1

| In-Band DTA PIDs |
| --- |
| PAT (PID 0) |
| CAT (PID 1) |
| EMM (PID X, defined in CAT) |
| NET (PID Y, defined in PAT, Service Number = 0x00) |
| EPG (PID Z) |
| CDL (PID W) |

The PID fixing component 734 fixes or updates the virtual channel message (VCM) in the NET PIDs, such as by updating the tuning parameters to correspond to where SDV control system 712 placed each service for one-way set top boxes 724. The VCM may include portions of a virtual channel table (VCT) and/or inverse channel table (ICT). The updated VCM allows one-way set top boxes 724, such as digital television adapters, to tune to switched broadcast services using the updated SI. The VCM messages contained in the NET PIDs identifies the QAM channel information and program number (or equivalently, service number) of each one-way set top box service in a virtual channel record. Because both the QAM channel information and program numbers can change from what is defined by the CA system 714, PID fixing component 734 must correct or update the QAM channel information and/or program numbers in the VCM based on where SDV control system 712 routes the one-way set top box services within the narrowcast or broadcast MPTSs.

For each one-way set top box service contained in the input VCM that corresponds to an active SDV session within a narrowcast service group, PID fixing component 734 modifies the QAM channel information and program number. The QAM channel information includes a reference to a carrier definition sub-table (CDS) entry and a modulation mode sub-table (MMS). If SDV control system 712 has not routed a one-way set top box service contained in the input VCM, PID fixing component 734 removes the corresponding virtual channel record from the output VCM to prevent a one-way set top box from tuning to either a wrong or non-existent service on that segment of the plant. Whenever a SDV session for a one-way set top box is established or removed, PID fixing component 734 updates the VCM to reflect the updating routing. Additionally, when the input VCM changes, PID fixing component 734 updates the output channel with those changes.

The network PID, may contain VCMs for multiple channel maps (VCM with different VCT IDs) where a given channel map may be targeted for specific CPE in a given segment of plant. The PID fixing component 734 updates all VCMs the same for all VCMs targeted to the same narrowcast service group or targeted broadcast service group. In other words, PID fixing component 734 makes the same updates to the VCMs that are for the same service group. Each narrowcast service group, or targeted node(s) can have its own channel map.

Additionally, the PID fixing component 734 fixes or updates the code version table (CVT) message within the NET PIDs, such as by updating the frequency in the CVT to match the MPTSs where a code download (CDL) was provisioned so that one-way set top boxes 724 can download new code releases. The CVT references the frequency and PID of each one-way set top box code download stream. A code download stream may include multiple code objects (e.g., code objects for multiple one-way set top box models). The NET PIDs CVT message may point to a single code download PID or multiple code download PIDs. An operator may manually configure code download PID(s) on the PID fixing component 734 and that component corrects the frequency in all CVT messages included in the stream. The PID fixing component 734 can uniquely identify each code download PID using, for example, the PID number. Moreover, PID fixing component 734 fixes or updates the program association table (PAT) of each narrowcast MPTS to identify the PID number of the NET PIDs, such as by updating service number 0 with the NET PIDs.

An example of operations of the VEDP 718 for DTAs is shown in Table 2 below. VEDP 18 outputs narrowcast MPTSs to EQAMs 720, such as via user datagram protocol (UDP), internet protocol (IP), and/or 10 gigabit Ethernet (10 GigE).

TABLE 2

VEDP Operations

Figure 9:
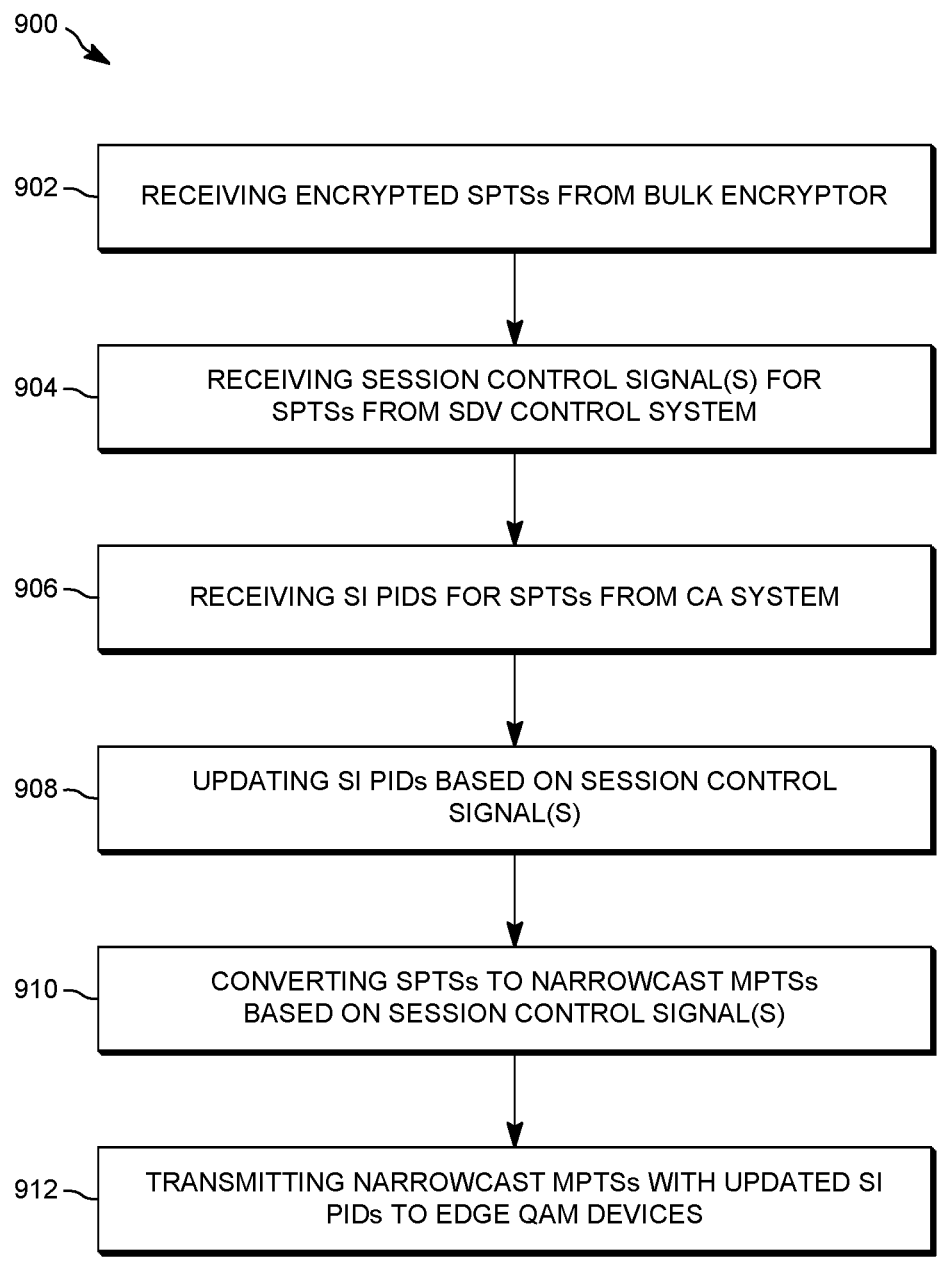
FIG. 9 illustrates a flowchart showing an example of a method of narrowcasting to one or more service groups having one or more one-way set top boxes with the SDV system of FIGS. 7-8.

Mux SDV/VOD services per R6 session set up
Insert DTA in-band PIDs per manual configuration
Update Network PID: fix frequency/Program Number/Service Number in VCM to match session set up
Update Network PID: fix frequency in CVT to match QAM with CDL
Update Program Number/Service Number 0 in PAT Referring to FIG. 9, an example of methods 900 for narrowcasting to a service group having one or more set top boxes is shown. At 902, encrypted single program transport streams (SPTSs) are received from a bulk encryptor, such as via user datagram protocol (UDP), internet protocol (IP), and/or 10 gigabit Ethernet (10 GigE). At 904, one or more session control signals for the SPTSs are received from a switched digital video (SDV) control system. At 906, service information (SI) on Network packet identifiers (PIDs) (e.g., in-band NET PIDs) for the SPTSs are received from a conditional access (CA) system, such as via user datagram protocol (UDP), internet protocol (IP), and/or 10 gigabit Ethernet (10 GigE).

At 908, the SI information on NET PIDs are updated based on the one or more session control signals. For example, one or more tuning parameters in a virtual channel message (VCM) in the NET PIDs may be updated to correspond to one or more edge QAM devices that are providing the narrowcast or broadcast MPTSs for one or more one-way set top boxes. The above updates may include updating QAM channel information and program number in the VCM to correspond to one or more edge QAM devices that are providing the narrowcast MPTSs for one or more one-way set top boxes. The VCM may be updated when a SDV session for the one or more one-way set top boxes is established or removed. Additionally, the same updates may be made to all VCMs for each service group.

Moreover, the above updates may include updating a code version table (CVT) message within the NET PIDs, such as updating frequency in the CVT message to match the narrowcast MPTSs when a code download (CDL) PID was provisioned. Furthermore, the above updates may include updating a program association table (PAT) of each of the narrowcast MPTSs and/or updating frequency in the CVT messages of one or more code download streams for one or more of the one-way set top boxes.

At 910, the SPTSs are converted to narrowcast multiprogram transport streams (MPTSs) based on the one or more session control signals. At 912, the narrowcast MPTSs and the updated NET PIDs are transmitted to a plurality of edge quadrature amplitude modulation (QAM) devices for narrowcasting to the different service groups.

Figure 10:
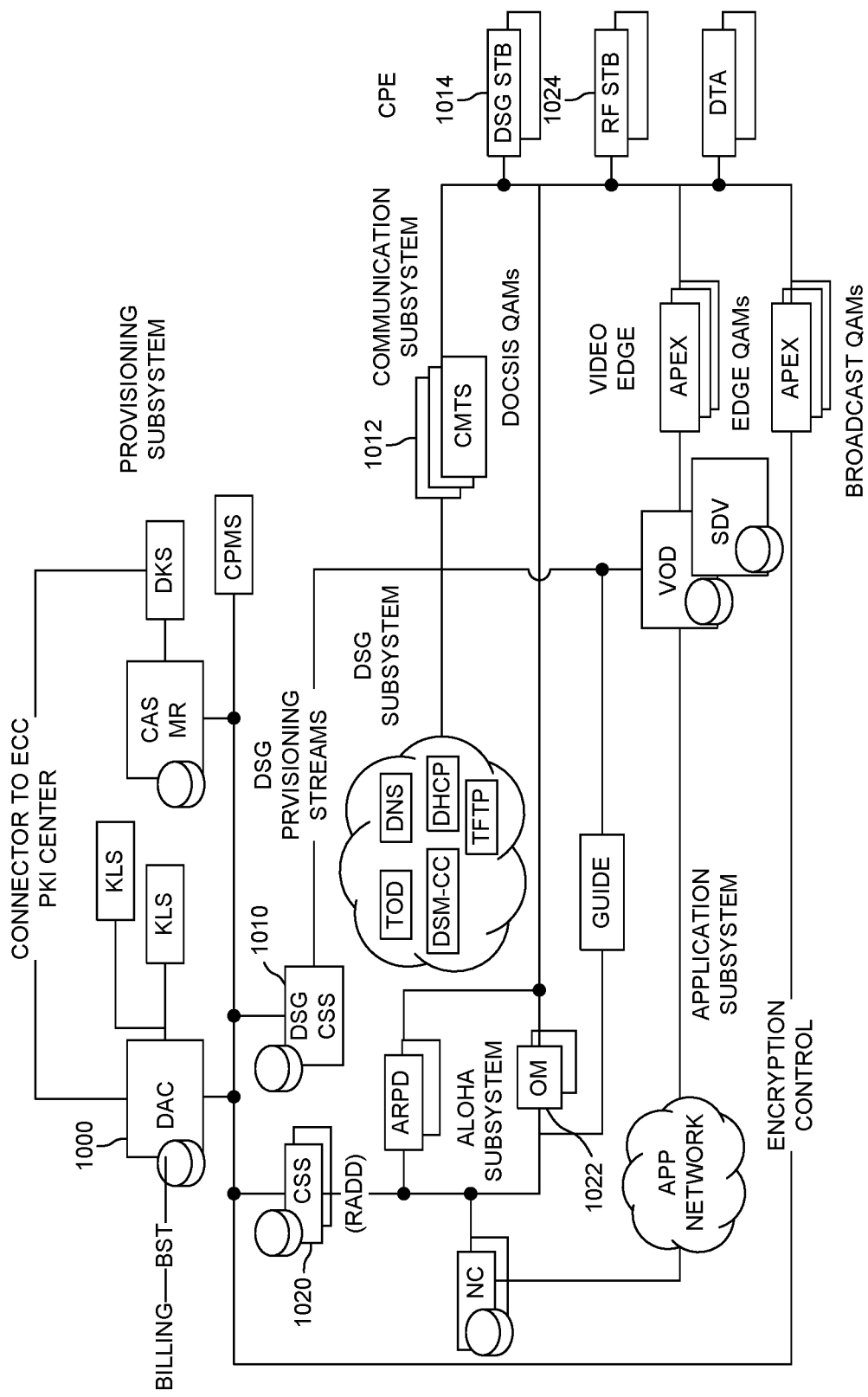
FIG. 10 illustrates a CPE provisioning controller architecture including digital access controller (DAC), RF STB and DSG STB

Referring to FIG. 10, the technique previously described of using the in-band QAMS for providing the channel maps to the customer premise equipment is premised on the cable networking system having a switch digital video system and the customer premise equipment likewise having the capability of processing the switch digital video. For example, the provisioning for switched digital video may be provided from the DAC (digital access controller) 1000, to a DSG (DOCSIS set-top gateway) 1010, via a cable modem termination system 1012, to one or more DSG STBs (DOCSIS set-top gateway set-top-box) 1014. This manner of provisioning from the DAC 1000 to the DSG STB 1014 is provided using the DOCSIS protocols, and requires a set-top-box that supports the DOCSIS protocol and switched digital video together with a DOCSIS path. For example, the provisioning for switched digital video may be provided from the DAC (digital access controller) 1000, to a RADD (a remote addressable hardware server) 1020, to an out of band modulator 1022, to one or more RF STBs (radio-frequency set-top-box) 1024 over an HFC network. This manner of provisioning from the DAC 1000 to the RF STB 1014 is provided using a different path and likewise requires a set-top-box that supports the out of band provisioning path/protocol and switched digital video without a DOCSIS return path. As it may be observed, the same system provides support for DSG STBs 1014 over DOCSIS path and RF STBs 1024 over out of band provisioning path, each of which have different capabilities. However, in many cases the system as well as specific programming stacks of RF STBs 1024 and DSG STBs 1014 may not provide support for switched digital video, and accordingly the provisioning of such set-top-boxes is not supported by the use of switched digital video. The configuration of the system may be modified, as desired, but may still maintain different types of set-top-boxes with different capabilities, some of which may support switched digital video and some of which may not support switched digital video.

Figure 11:
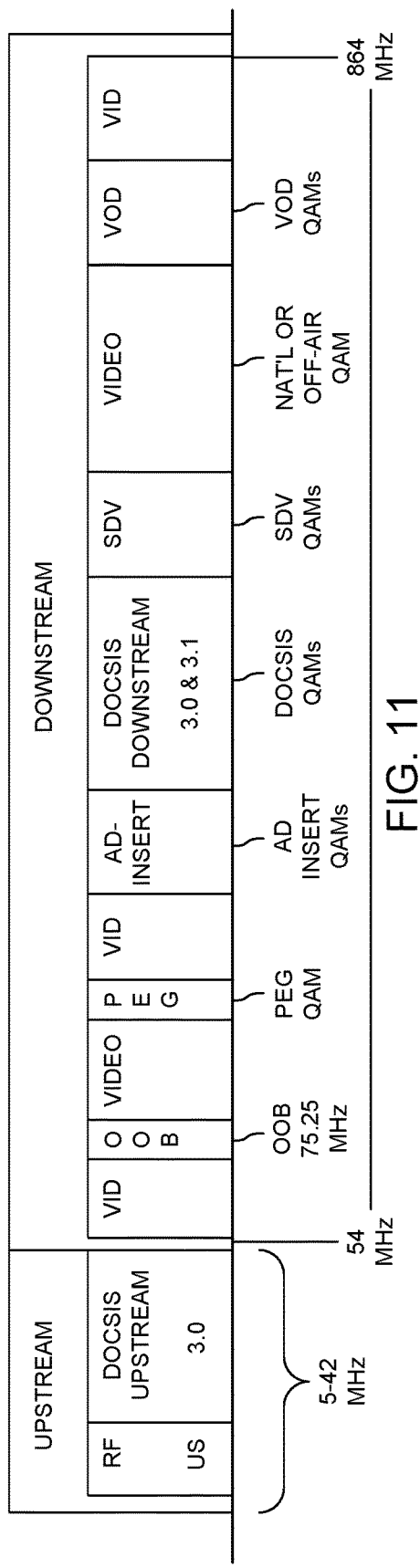
FIG. 11 illustrates a typical low-split plant bandwidth plan with 5-42 MHz upstream

Referring to FIG. 11, the bandwidth allocation used for a RF STB traditionally may include an upstream frequency range from 5 MHz-42 MHz and a downstream frequency range from 54 MHz to 864 MHz (or greater). The provisioning for the channel maps is performed using the out of band frequency of 75.25 MHz as shown in the figure or a number of other frequencies within the range of 72.75 MHz and 116.25 MHz (e.g., 104.20, 116.25, 110.25, 107.40, 107.25, 75.25, 72.75, 92.25, 98.25, 103.75), which is within the downstream frequency range, of the step top box architecture. The provisioning for the channel maps at the 75.25 MHz out of band frequency provides configuration information to the set-top-box to define various downstream frequency ranges to receive broadcast video within the range of 54 MHz to 864 MHz (or greater).

Figure 12:
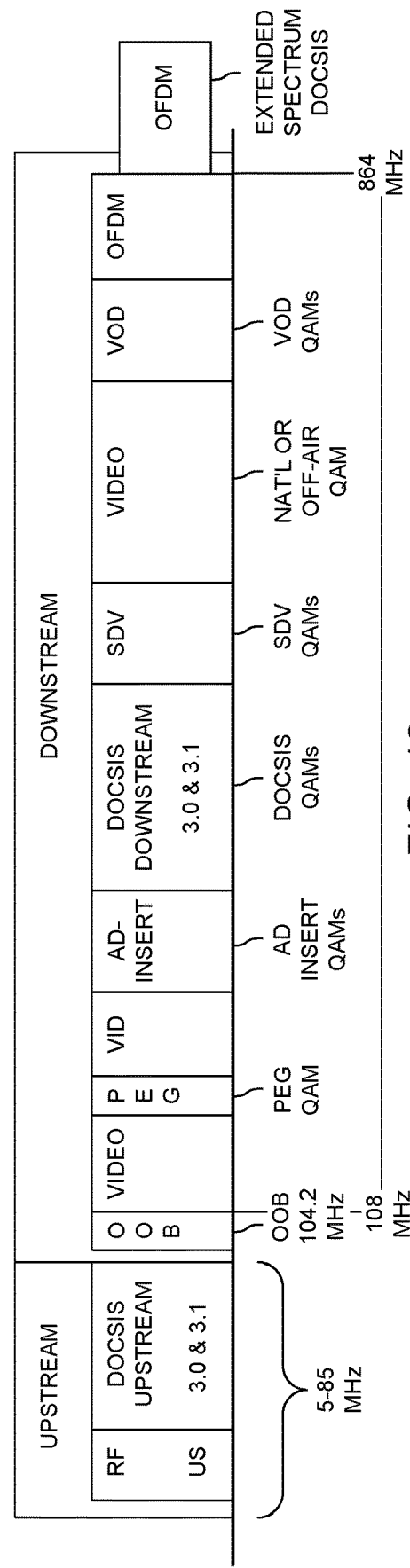
FIG. 12 illustrates a typical mid-split plant bandwidth plan with 5-85 MHz upstream

Referring to FIG. 12, the bandwidth allocation used for a RF STB traditionally may include an upstream frequency range from 5 MHz-85 MHz and a downstream frequency range from 108 MHz to 864 MHz (or greater)—representing a typical mid-split plan. The provisioning for the channel maps is performed using the out of band frequency of 104.2 MHz, which is within the downstream frequency range, of the step top box architecture. The provisioning for the channel maps at the 104.2 MHz out of band frequency provides configuration information to the set-top-box to configure various downstream frequency ranges to receive broadcast video within the range of 108 MHz to 864 MHz (or greater).

Figure 13:
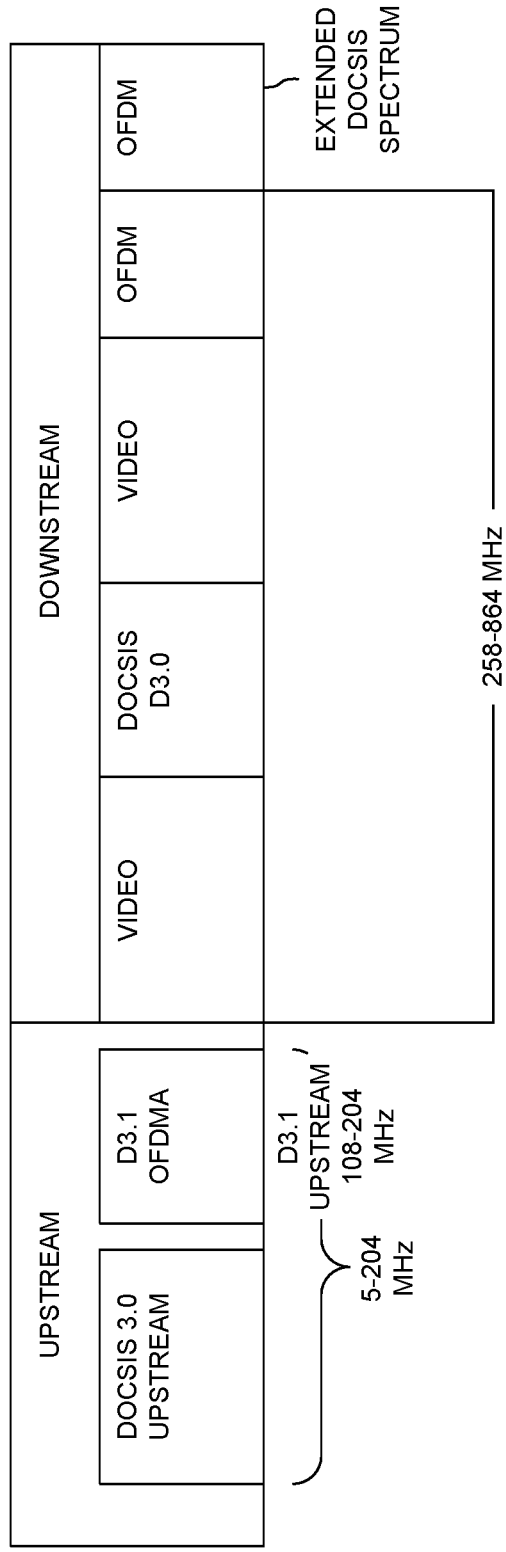
FIG. 13 illustrates a typical high-split plant bandwidth plan with 5-204 MHz upstream
Figure 14A:
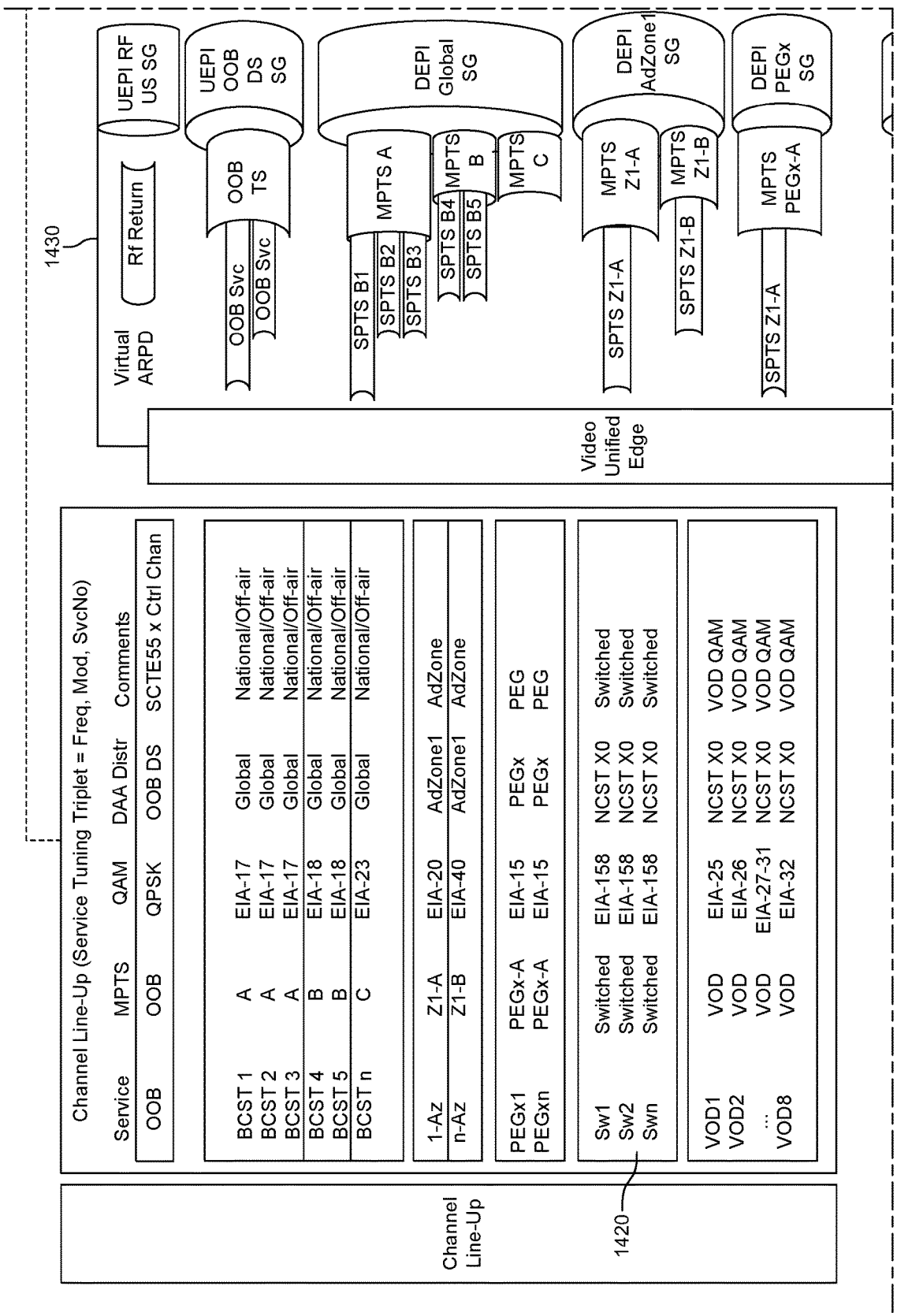
Figure 14B:
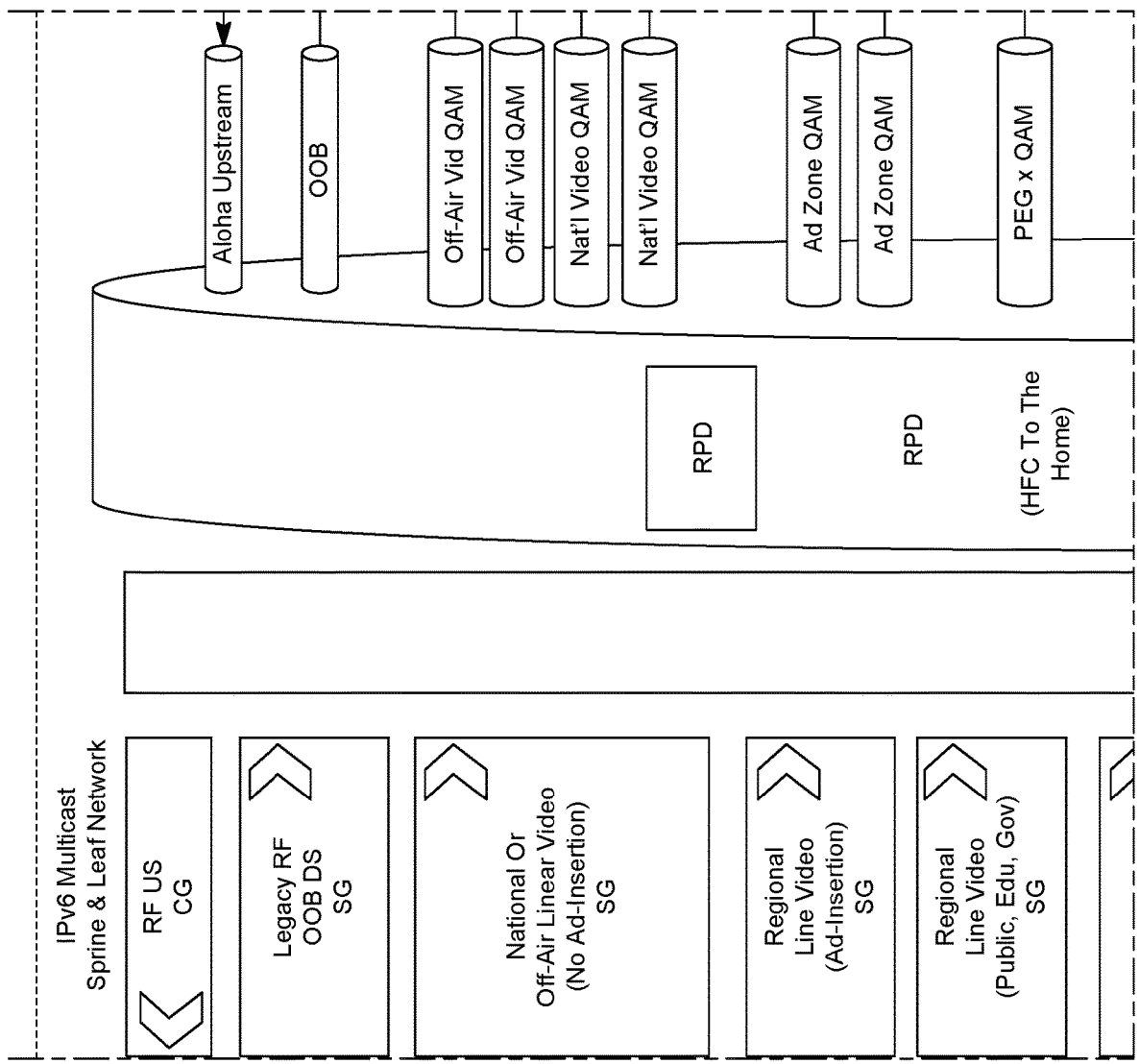
Figure 14C:
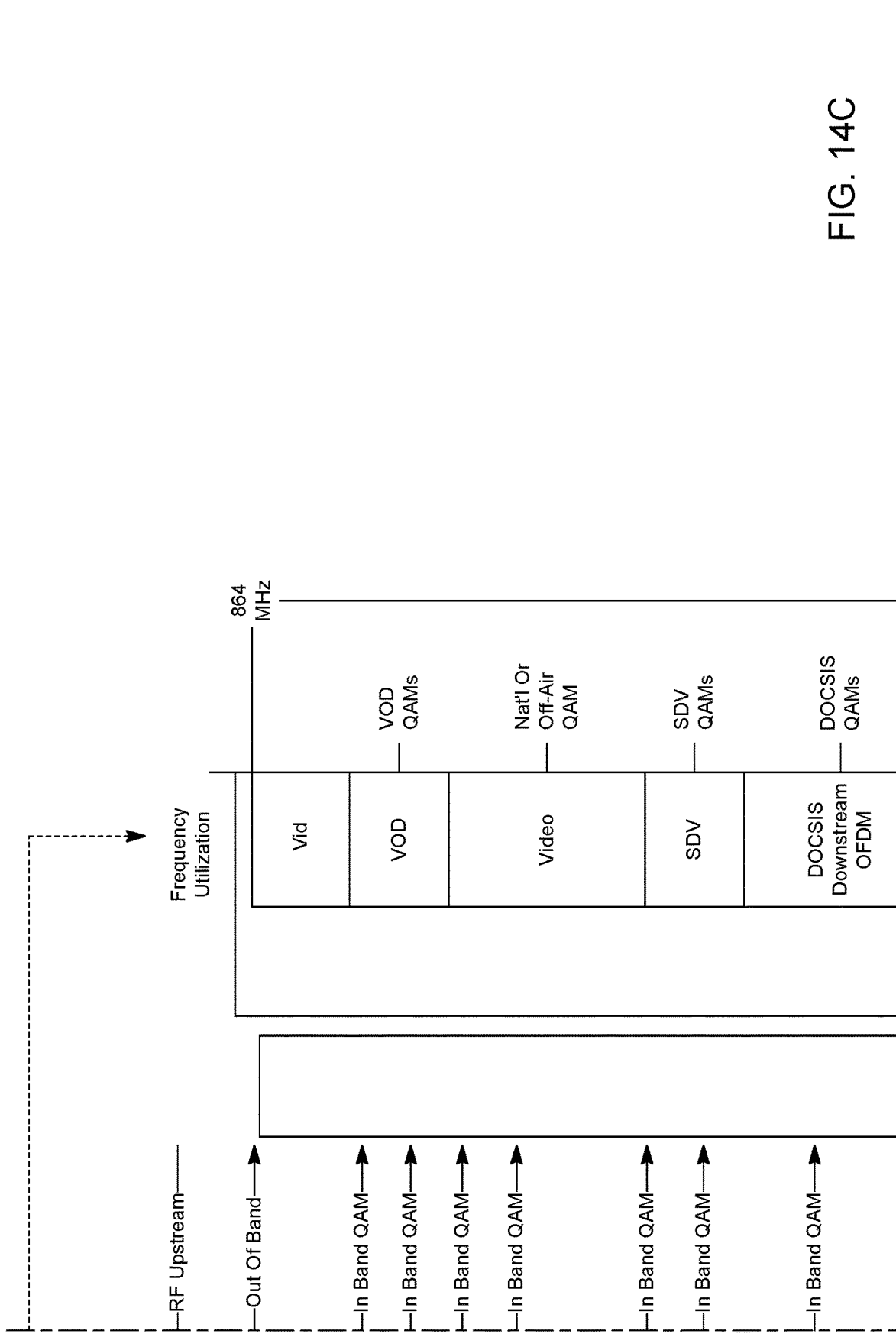
Figure 14D:
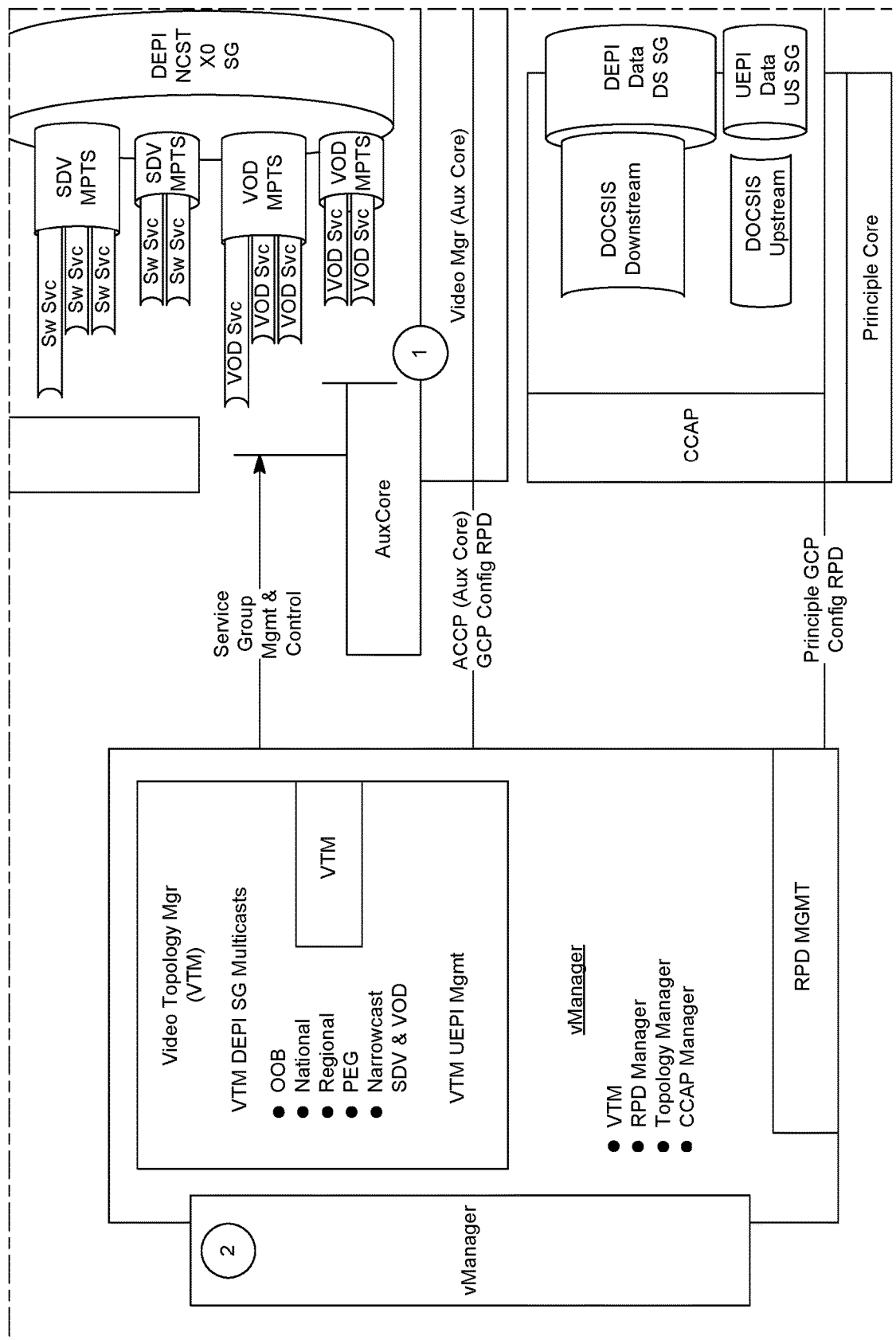
Figure 14E:
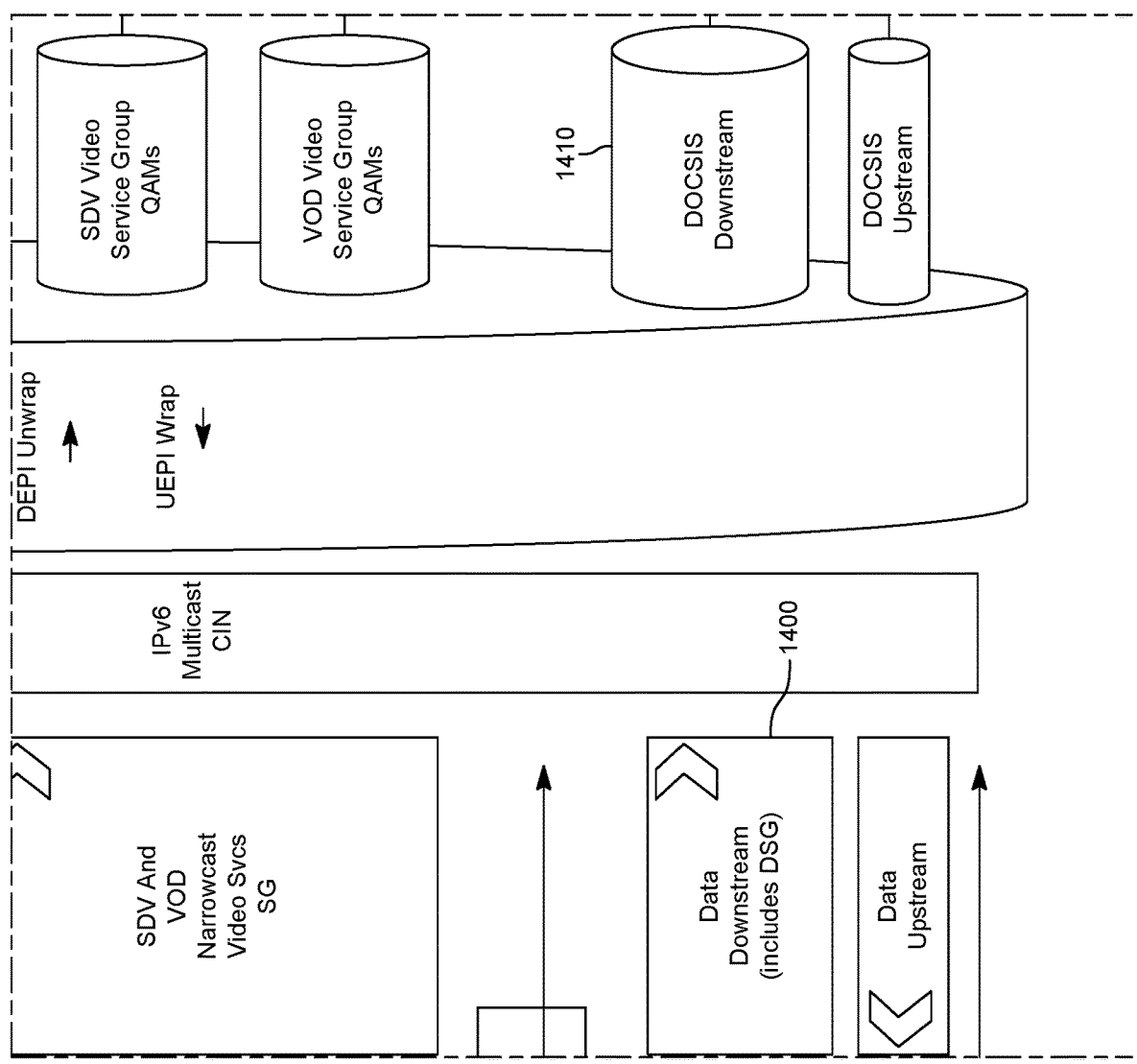
Figure 15A:
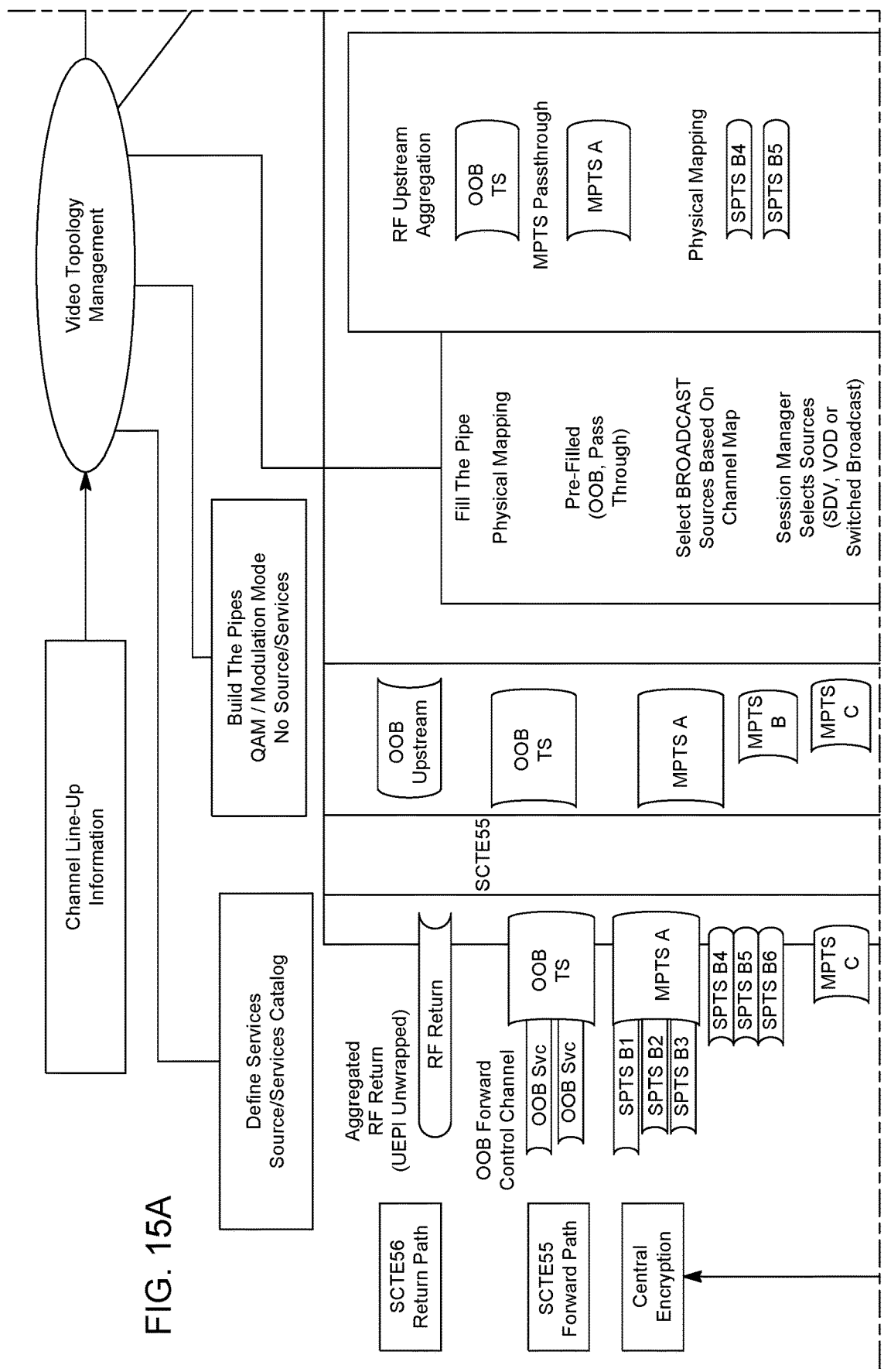
Figure 15B:
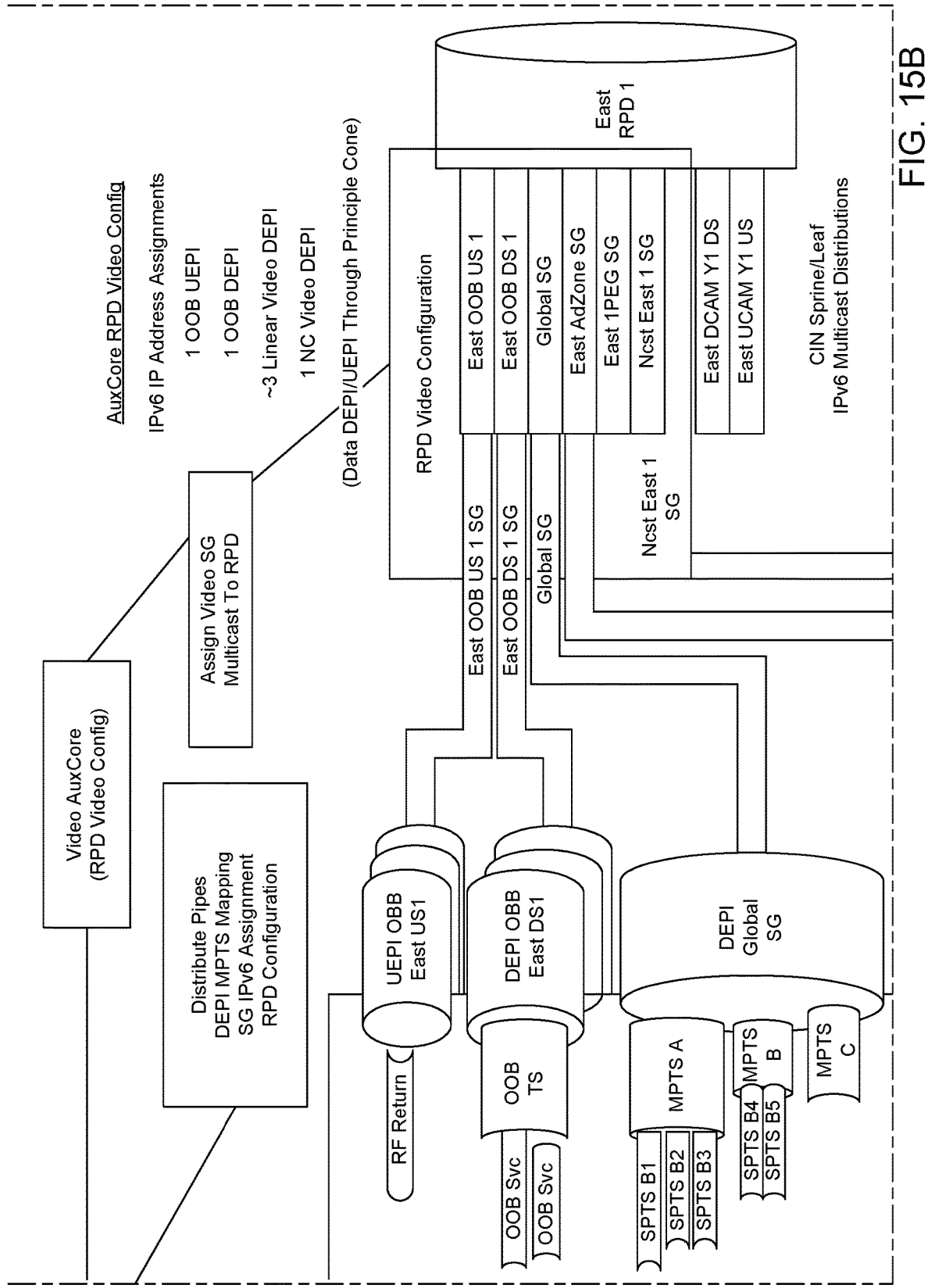
Figure 15D:
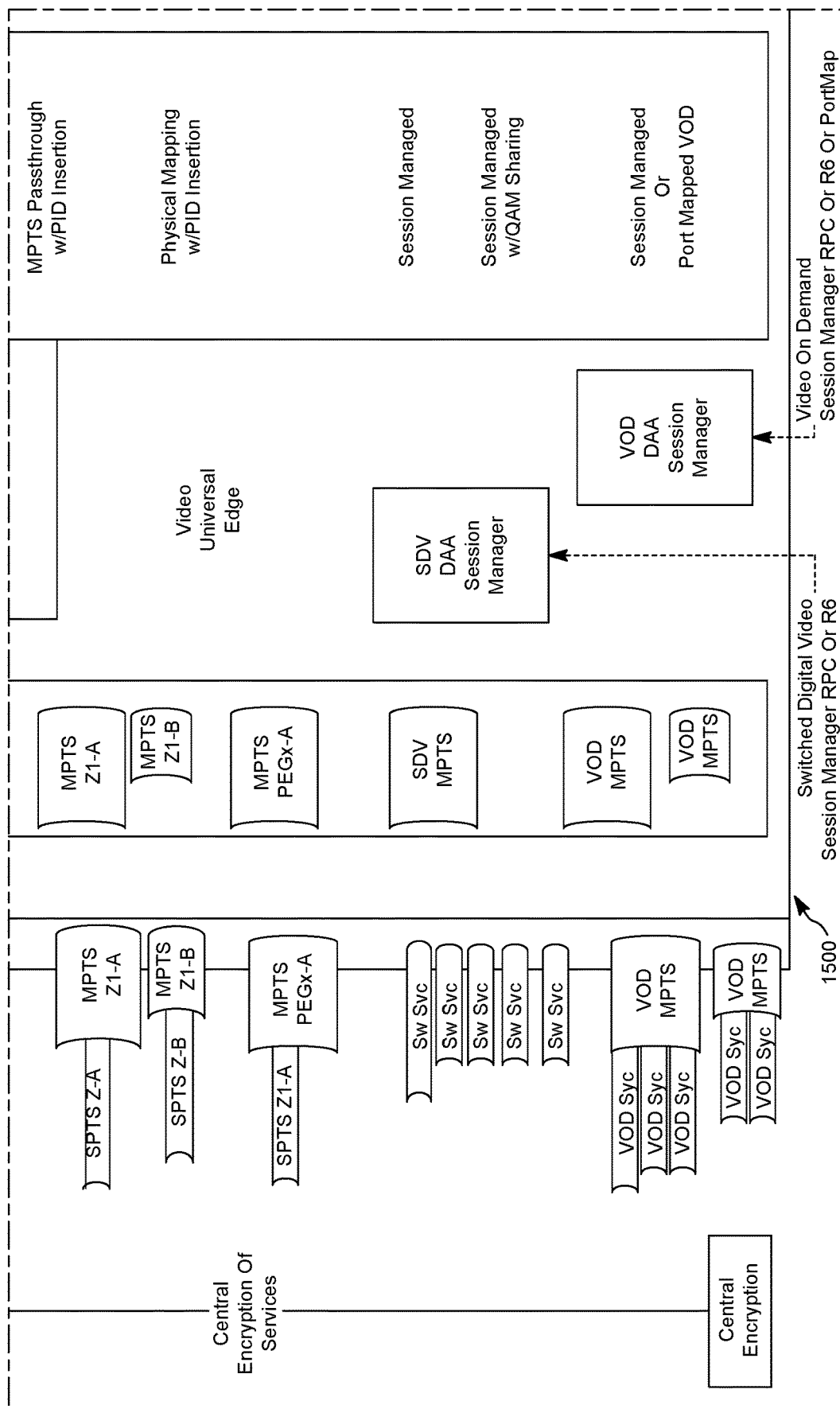
Figure 15E:
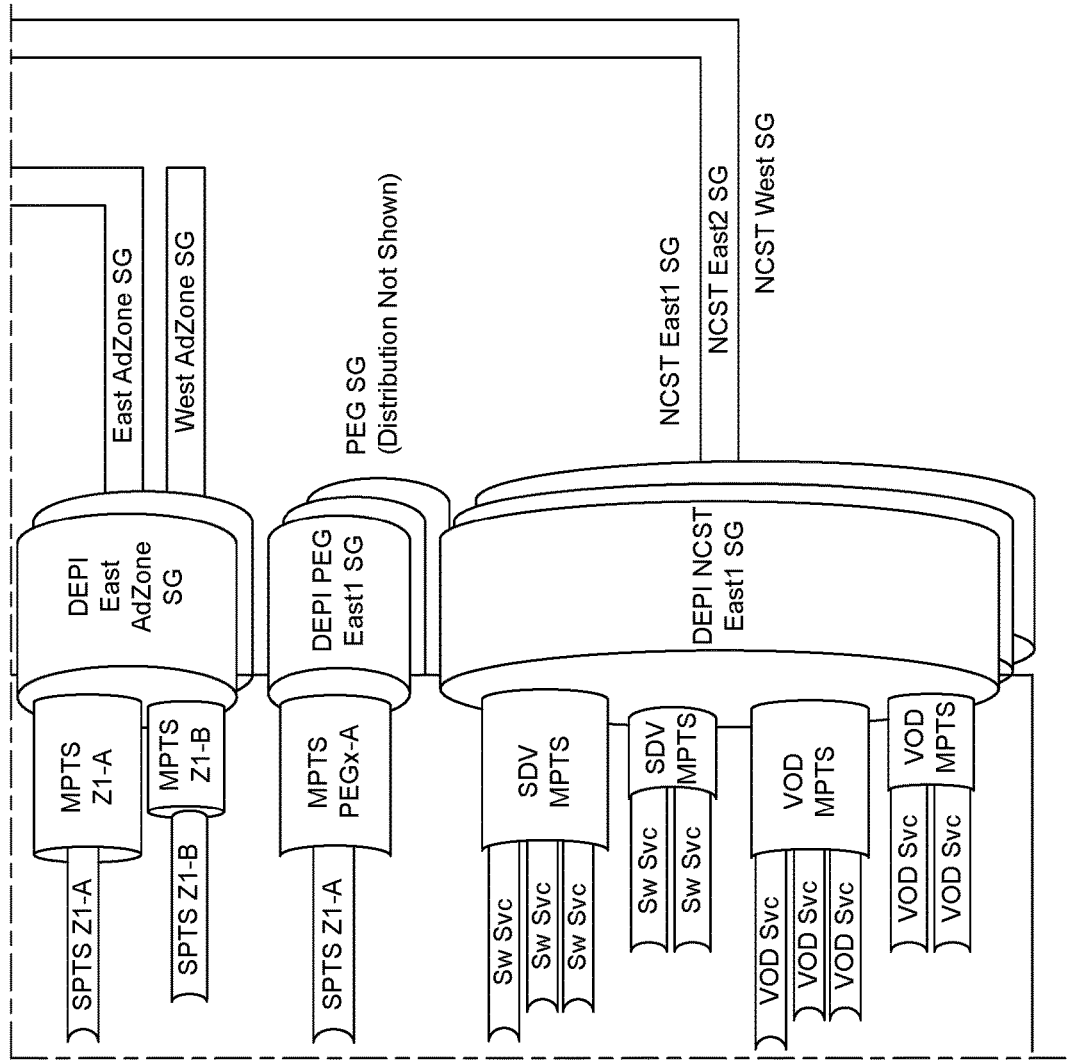
Figure 15F:
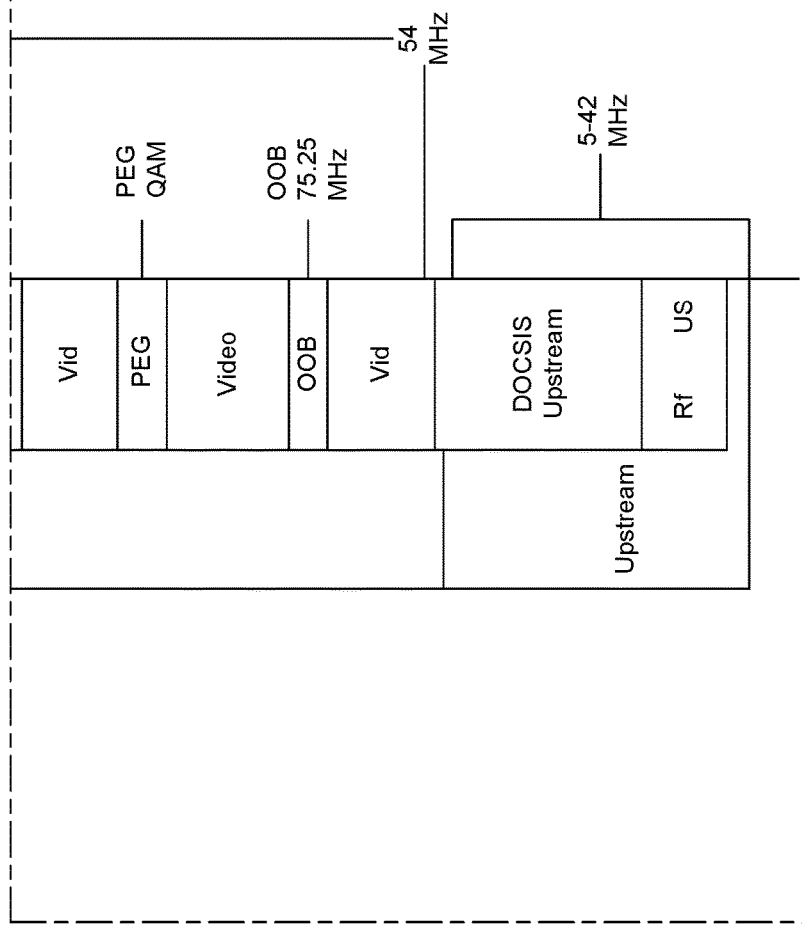

Referring to FIG. 13, over time, it has become desirable to reclaim additional bandwidth for the upstream data path which results in what may be generally referred to as a high split architecture. The high split architecture may include an upstream frequency range from 5 MHz-204 MHz and a downstream frequency range from 258 MHz to 864 MHz (or greater)-representing a typical high-split plan. The channel provisioning for the DSG STB may be provided within the DOCSIS signalling which is within the downstream frequency range from 258 MHz to 864 MHz (or greater). However, the channel provisioning for the RF STB is provided at the out of band frequency (e.g., 75.25 MHz or 104.2 MHz or within 72.75 MHz-116.25 MHz) which, if with a high split architecture in order to reclaim additional bandwidth for the upstream data path, is no longer available. Also, the RF STB may not support provisioning using traditional DOCSIS signalling if it does not include a DOCSIS return path (these set-tops are either removed in a high split architecture or may be accommodated with a Local Out of Band Converter or LOC in which case, the provisioning path is over DOCSIS DSG path to the LOC and low frequency RF to/from the RF Set-top). Furthermore, if the RF STB does not include the capability of processing switched digital video, the aforementioned technique described with respect to FIG. 7-9 will likewise not be capable of providing the provisioning with switched digital video for such a high split architecture.

Referring also to FIG. 14, to support the provisioning of RF STBs that are traditionally provisioned using the out of band frequency of either 75.25 MHz or 104.2 MHz, in a high split architecture, it was determined that a "modified" DSG tunnel may provide signalling between the digital access controller 1000 using the DSG (DOCSIS set-top gateway) 1010 and its associated DOCSIS QAMS. It was further determined that the "modified" DSG tunnel may be configured based upon information from the switched digital video 1420, that includes the tuning triplets for the broadcast video, generated within the headend. The resulting configuration information for the switched digital video, which is used to automate the channel line-up, may then be encapsulated within the DOCSIS downstream data path 1400, 1410 to the RF STBs with LOC or DSG STBs. By way of example, the video unified edge 1430 receives the switched digital video channels 1420 (e.g., EIA-158) which are arranged by the switched digital system into the frequency alignment which the video unified edge 1430 in turn provides "legacy" type triplets with the EIA-158's removed in the channel line-up. The resulting "legacy" type triplets are then provided in the DOCSIS downstream data path 1400, 1410.

The channel maps may be provided to the set-top-boxes over a switched digital video channel, encapsulated within the DOCSIS downstream data path or carried on the in-band QAM or carried on the out of band RF channel. Channel mapping normally carried in the out of band frequency may be carried to the RF STB over the DOCSIS downstream, which is an Internet Protocol based data traffic with an LOC. Also, by using the switched digital video capabilities of the head end for the channel map generation, provides an additional benefit that the particular group of STBs, such as those defined by the services of a remote physical device or otherwise a selected group of STBs, can be provided a particularized set of channel map information, using the "modified" DOCSIS tunnel. Alternatively, the channel map and related system information can be modified for use with non-switched digital video and carried on the same paths. Accordingly, the channel management is preferably moved at least in part from the digital access controller, to the node for a group of STBs.

Referring also to FIG. 15, a video universal edge 1500 may define the available video services, pipe templates, filing the pipes by aligning the channel line up with the tuning triplets (i.e. frequency, modulation mode, and service number), collecting the pipes into service groups, and assigning the service groups to a remote physical device (if included). In this manner, the pipe set-up, stream mapping, DEPI wrapping, and QAM frequency placement may be controlled by a video topology manager which may be part of the video universal edge 1500. Other breakouts may be used, such as some suitable for a DVB system. The channel mapping information from the video universal edge 1500 is provided to the STB through the DOCSIS downstream data path 1400, 1410 or through an OOB signal 1430. The channel mapping information provided through the DOCSIS downstream data path defines the video service placement on the frequency spectrum and also defines the video services that are available. By preferably moving all provisioning in a specific node to only the DOCSIS path, the video services may be defined in a downstream region of the high split architecture (e.g., 258 MHz to 864 MHz (or greater). With the video services defined in the downstream region of the high split architecture, the out of band frequency of either 75.25 MHz or 104.2 MHz is not needed for channel provisioning.

Figure 16A:
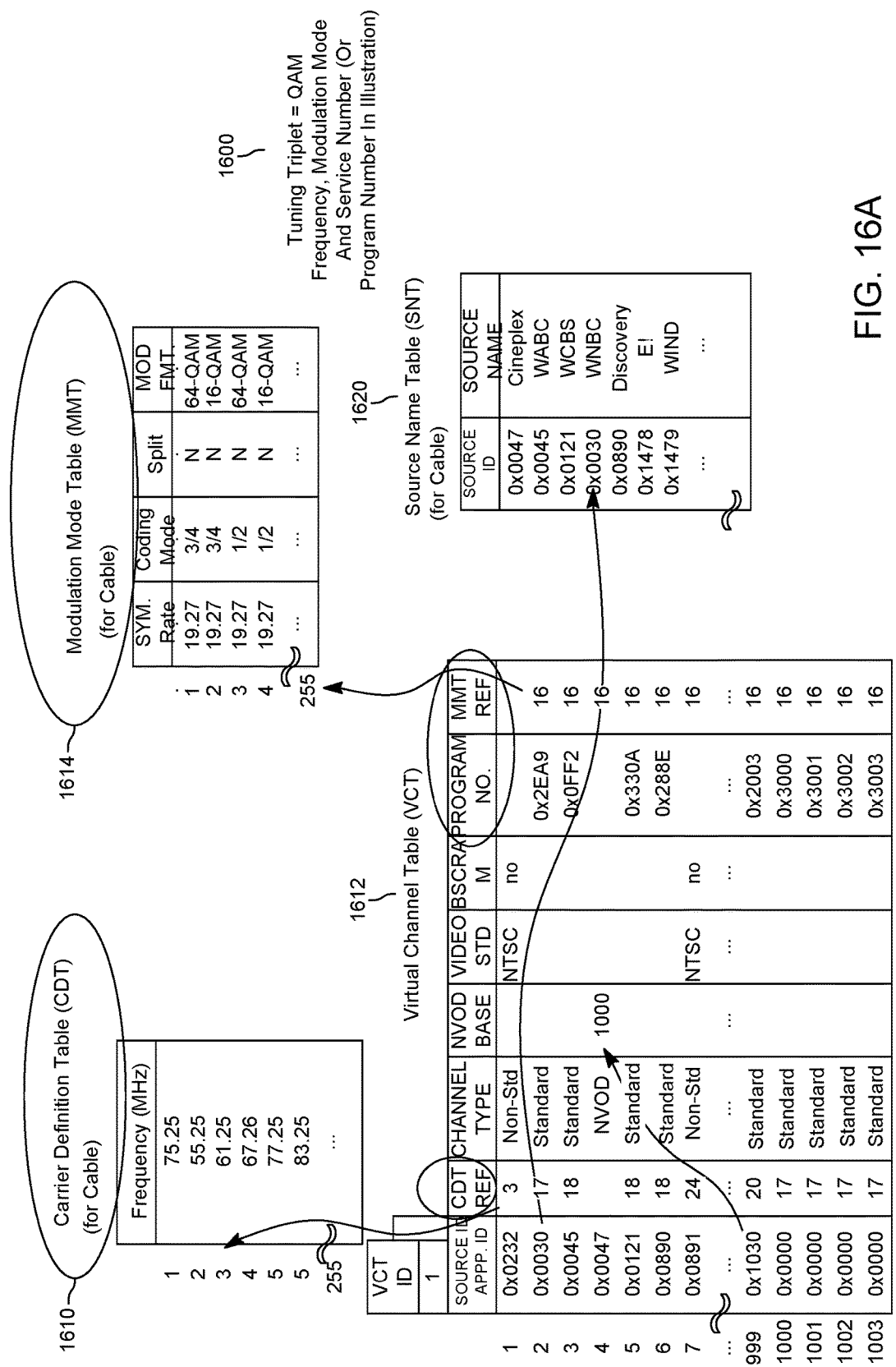

Referring also to FIG. 16, an illustration of the tuning triplet 1600 (e.g., QAM frequency, modulation mode, and service number) are illustrated. The tuning triplet may be based upon a Carrier Definition Table (CDT) 1610, a Virtual Channel Table (VCT) 1612, and a Modulation Mode Table (MMT) 1614. In addition, to the channel map information, which may be compliant with or otherwise based upon ANSI/SCTE 65 2008, Service Information Delivered Out-Of-Band For Digital Cable Television, incorporated by reference herein in its entirety. All or a portion of a Source Name Table (SNT) 1620 may be included together with the channel map information. The information in the source name table may be used to identify services available to a segment of the network. FIG. 16 also illustrates exemplary channel map progressions from a normal channel map 1630 for a low split or a universal channel map (in this illustration, a high split channel map) 1640 for a high split. It is noted that the high split channel map 1640 removes the out of band channels and moves all the broadcast video to EIA-158. The channel map progression then includes a modified high split channel map 1650 where the switched services (EIA-158) may be optionally removed if the consumer premise devices are not capable of processing switched digital video. Also, for the modified high split channel map 1650, the broadcast video services are moved to the high range of the split (e.g., above 258 MHz).

In some systems, multiple channel maps may be provided to a segment of a plant and the specific set-top-box may select the appropriate channel map from among those provided based upon the configuration it receives from the provisioning controller (such as DAC). Preferably, by use of the switched digital video system providing data that is used by the DOCSIS downstream data path within the modified DSG tunnel, the data being provided is directed to a relatively small group of set-top-boxes—for example, to a single node. With the relatively small group of set-top-boxes preferably only a single channel map is provided, which is then used by the respective set-top-box. By way of example, the digital access controller may provide a large channel map that provides services that are not applicable to a particular group of devices (e.g., the devices supported by a single remote physical device), and the switched digital video controller of the video unified edge provides a subset of the large channel map as a single channel map that is particularized for the group of destination devices. In some cases, such as hospitality, multiple channel maps are often required even to a single node. In such cases, the system makes the appropriate adjustments to the maps that need to be delivered to a particular node.

By way of example, the digital access controller and the RADD may generate an "out of band channel map" which is then processed by the CMTS to provide the modified DSG tunnel which is provided to the set top boxes, including those which may not include switched digital video capability.

As it may be observed, the digital access controller may create a channel map for all the potential channels that may be desired, which may be further refined by the switched digital video system to define narrowcast groups of customer premise devices for the particularized channel maps to the particularized narrowcast group with channel maps having fewer channels. In the case of a distributed access architecture, the narrowcast groups may be consistent with the customer serviced by a remote physical device.

Preferably, for a non-distributed access architecture, the modification and/or encapsulation of the information from the switched digital video system into the modified DOCSIS tunnel is performed prior to the cable modem termination system. Preferably, for a distributed access architecture, the modification and/or encapsulation of the information from the switched digital video system into the modified DOCSIS tunnel is performed prior to the remote physical device.

A diplex filter associated with the set-top-box may be also modified to provide a frequency split between the upstream frequency range and the downstream frequency range, placed in the HFC plant where the optical signal is converted to RF.

By way of example, the system may be provided with or otherwise create universal system information or list of video channels that are available under a provisioning controller. The provisioning controller may be at a regional, metro level, and/or sub-metro level and is responsible for provisioning CPE. It is desired that the provisioning functions, driven from billing systems/back office systems remains unchanged. The system information may be described in a manner based upon the SCTE 65, where the SCTE 65 channel information may include any of the carrier definition table, modulation mode table, channel map, defined channel map, inverse channel map, and/or source name table. The universal system information is modified for a subset of the universal consumer premise equipment provisioning controller footprint based on physical or logical network structures forming a specific segment of the consumer premise equipment provisioning controller footprint (e.g., (1) physical may be a distribution paths through network switches to different regions, in-band QAMs, out-of-band distributions (SCTE 65), or IP or DOCSIS based distributions, RF combiners that feed optical distributions, optical distributions (both analog and digital), node distributions that may also contain diplex filters; (2) logical may be constructed paths such as IP single-cast/multicast, "DSG Tunnel," DAA DEPI distributions, or controller defined downstream plants that represent specific information paths for that system information. DAA DEPI distribution is distributed access architecture (DAA) downstream external PHY interface (DEPI) and PHY=physical interface).

Modified system channel information may be added or subtracted from the universal system information being distributed to the segment to represent the subset of video services of what should or is available to the segment. The modified system channel information specifies tuning triplet (QAM frequency, modulation mode, service number) where a video service is placed on the segment, and specified to be consistent with the target CPE (switched/non-switched capable). The modified subset may be the same for different segments of the physical or logical network structures.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method for providing provisioning broadcast channels for a plurality of customer premise equipment comprising the steps of:
   (a) receiving a channel lineup of video channels for a first set of customer premise equipment;
   (b) modifying said channel lineup to form at least one channel map for said provisioning broadcast channels for a subset of said first set of said customer premise equipment;
   (c) providing said at least one channel map as part of DOCSIS downstream data to said customer premise equipment for said provisioning broadcast channels for said customer premise equipment.

2. The method of claim 1 wherein said DOCSIS downstream data is provided by a DOCSIS set-top-gateway multicast to a cable modem termination system.

3. The method of claim 2 wherein said DOCSIS downstream data is provided by said cable modem termination system to said customer premise equipment.

4. The method of claim 1 wherein said channel lineup of said video channels is based upon information from a video provisioning controller.

5. The method of claim 1 wherein said DOCSIS downstream data is at a provided at a frequency greater than an upstream frequency range of said customer premise equipment.

6. The method of claim 1 wherein said DOCSIS downstream data is at a provided at a frequency above greater than 258 MHz.

7. The method of claim 1 wherein said customer premise equipment includes the capability of processing switched digital video.

8. The method of claim 1 wherein said customer premise equipment does not include the capability of processing switched digital video.

9. The method of claim 1 wherein said customer premise equipment does not include a DOCSIS return path.

10. The method of claim 1 wherein a portion of a source name table is included together with said channel map as part of said DOCSIS downstream data to said customer premise equipment for said provisioning broadcast channels for said customer premise equipment.

11. The method of claim 1 wherein said receiving said channel lineup is based upon switched digital video channel.

12. The method of claim 1 wherein said at least one channel map includes at least one of (i) carrier definition frequencies, (ii) source ID, (iii) source names, (iv) modulation mode, and (v) service number.

13. A method for providing provisioning broadcast channels for a customer premise equipment comprising the steps of:
   (a) receiving a first channel map defining a first set of broadcast channels;
   (b) selecting a sub-set of said first channel map to define a channel lineup for video channels;
   (c) receiving a second channel lineup based upon said sub-set of said first channel map of video channels;
   (d) modifying said second channel lineup to form a second channel map having a second set of broadcast channels for said provisioning broadcast channels for said customer premise equipment, where said second set of broadcast channels is not a greater number of broadcast channels than said first set of broadcast channels.

14. The method of claim 13 further comprising providing said second channel map as part of DOCSIS downstream data to said customer premise equipment for said provisioning said second set of broadcast channels for said customer premise equipment.

15. The method of claim 13 wherein said DOCSIS downstream data is provided by a DOCSIS set-top-gateway multicast to a cable modem termination system.

16. The method of claim 15 wherein said DOCSIS downstream data is provided by said cable modem termination system to said customer premise equipment.

17. The method of claim 13 wherein said second channel lineup of said video channels is based upon information from a video provisioning controller.

18. The method of claim 13 wherein said DOCSIS downstream data is at a provided at a frequency greater than an upstream frequency range of said customer premise equipment.

19. The method of claim 13 wherein said DOCSIS downstream data is at a provided at a frequency above greater than 258 MHz.

20. The method of claim 13 wherein said customer premise equipment includes the capability of processing switched digital video.

21. The method of claim 13 wherein said customer premise equipment does not include the capability of processing switched digital video.

22. The method of claim 3 wherein said customer premise equipment does not include a DOCSIS return path.

23. The method of claim 13 wherein a portion of a source name table is included together with said second channel map as part of said DOCSIS downstream data to said customer premise equipment for said provisioning second set of broadcast channels for said customer premise equipment.

24. The method of claim 21 wherein said second channel map includes at least one of (i) carrier definition frequencies, (ii) source ID, (iii) source names, (iv) modulation mode, and (v) service number.

25. The method of claim 21 wherein said channel lineup is based upon switched digital video channel.

* * * * *